US010136425B2

(12) United States Patent
Chen et al.

(10) Patent No.: US 10,136,425 B2
(45) Date of Patent: Nov. 20, 2018

(54) APPARATUS AND METHOD OF USING TIME REUSE FRAME STRUCTURES FOR MULTI-HOP COMMUNICATIONS

(71) Applicant: Convida Wireless LLC, Wilmington, DE (US)

(72) Inventors: Zhuo Chen, Claymont, DE (US); Hongkun Li, Malvern, PA (US); Chonggang Wang, Princeton, NJ (US); Qing Li, Princeton Junction, NJ (US); Paul L. Russell, Jr., Pennington, NJ (US); Tao Han, North Arlington, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 162 days.

(21) Appl. No.: 14/701,329

(22) Filed: Apr. 30, 2015

(65) Prior Publication Data
US 2015/0319759 A1    Nov. 5, 2015

Related U.S. Application Data

(60) Provisional application No. 61/987,945, filed on May 2, 2014.

(51) Int. Cl.
*H04W 72/04* (2009.01)
*H04L 29/08* (2006.01)
(Continued)

(52) U.S. Cl.
CPC ......... *H04W 72/0446* (2013.01); *H04L 47/17* (2013.01); *H04L 67/10* (2013.01);
(Continued)

(58) Field of Classification Search
None
See application file for complete search history.

(56) References Cited

U.S. PATENT DOCUMENTS

| 7,929,477 B2 * | 4/2011 | Feng ......................... H04B 7/26 370/315 |
| 7,974,240 B2 * | 7/2011 | Liu ..................... H04B 7/15542 370/329 |

(Continued)

OTHER PUBLICATIONS

IEEE P802.15—Proposed Resolution for LB#85 CID 284-287.*

(Continued)

*Primary Examiner* — Candal Elpenord
(74) *Attorney, Agent, or Firm* — Baker & Hostetler, LLP

(57) ABSTRACT

A system and method of using time reuse frame structures for improving multi-hop communications are disclosed. Namely, the system is networked and includes a superframe structure for multi-hop communication including tiers. The system also includes a computer-implemented device located in an initiator subframe of a first tier frame of the superframe. The device including a non-transitory memory including executable instructions for multi-hop communication and a processor operably coupled thereto for executing the multi-hop communication. The system also includes a second tier frame of the superframe including at least two hopper subframes. Each of the at least two hopper subframes including a contention access period and a contention free period.

12 Claims, 23 Drawing Sheets

(51) Int. Cl.
  *H04W 74/02* (2009.01)
  *H04L 12/801* (2013.01)
  *H04W 72/12* (2009.01)
  *H04W 84/18* (2009.01)
(52) U.S. Cl.
  CPC ......... *H04W 72/121* (2013.01); *H04W 74/02* (2013.01); *H04W 84/18* (2013.01)

(56) References Cited

U.S. PATENT DOCUMENTS

| | | | | |
|---|---|---|---|---|
| 8,576,811 | B2* | 11/2013 | Belcea | H04L 41/00 370/329 |
| 2006/0268908 | A1* | 11/2006 | Wang | H04L 12/2697 370/401 |
| 2007/0104223 | A1* | 5/2007 | Lee | H04W 72/042 370/470 |
| 2008/0151821 | A1* | 6/2008 | Cho | H04W 16/10 370/329 |
| 2009/0245165 | A1* | 10/2009 | Li | H04W 72/04 370/315 |
| 2009/0279496 | A1* | 11/2009 | Raissi-Dehkordi | H04W 16/04 370/329 |

OTHER PUBLICATIONS

Kwak et al, "Two-Hop Wireless Channel Access Protocol With Busy Tone", VTC 2882-Fall. 2882 IEEE 56TH. Vehicular Technology Conference Proceedings. Vancouver, Canada, Sep. 24-28, 2882; [IEEE Vehicular Technolgy Conference], New York, NY: IEEE, vol. 4, Sep. 24, 2002.

Max et al, "Interference Awareness in IEEE 802.11 Mesh Networks", Proceedings of 12th European Wireless Conference 2006, Apr. 1, 2006, pp. 1-6.

International Patent Application No. PCT/US2015/028553: Invitation to Pay Additional Fees and, Where Applicable, Protest Fee dated Jul. 31, 2015, 17 pages.

3GPP S1-120059, "Suggested D2D Terminologies (Operator Managed, Operator Assisted, Operator Free)", TSG-SA WG1 Meeting #57 S1-120059 Kyoto, Japan, Feb. 13-17, 2012, 3 pages.

Heile, R., IEEE P802.15.8 , "Wireless Medium Access Control (MAC) and Physical Layer (PHY) Specifications for Peer Aware Communications (PAC)", Feb. 2012, 2 pages.

Hernandez et al, IEEE P802.15 Working Group for Wireless Personal Area Networks (WPANs), "Channel models for TG8", Sep. 2012, 59 pages.

IEEE Std 802.11, IEEE Standard for Information technology, "Telecommunications and information exchange between systems Local and metropolitan area networks—Specific requirements; Part 11: Wireless LAN Medium Access Control (MAC) and Physical Layer (PHY) Specifications", IEEE Computer Society, Mar. 2012, 2793 pages.

IEEE Std 802.15.4m, IEEE Standard for Local and metropolitan area networks, Part 15.4: Low-Rate Wireless Personal Area Networks (LR-WPANs), "Amendment 6: TV White Space Between 54 MHz and 862 MHz Physical Layer", IEEE Computer Society, Mar. 2014, 118 pages.

IEEE Std 802.15.4™—2011, "IEEE Standard for Local and metropolitan area networks, Part 15.4: Low-Rate Wireless Personal Area Networks (LR-WPANs)", IEEE Computer Society, Sep. 5, 2011, 314 pages.

Lee, M, IEEE P802.15 SG PAC Introduction, "Working Group for Wireless Personal Area Networks (WPANs), PAC Introduction", Jan. 18, 2012, 20 pages.

Lee, M., IEEE P802.15 Working Group for Wireless Personal Area Networks (WPANs), "Peer Aware Communications (PAC) Study Group 5 Criteria", Jan. 2012, 4 pages.

Verso, B and McLaughlin, M., IEEE P802.15.8 Working Group for Wireless Personal Area Networks (WPANs), "UWB PHY Proposal to TG8",Jul. 2013, 10 pages.

* cited by examiner

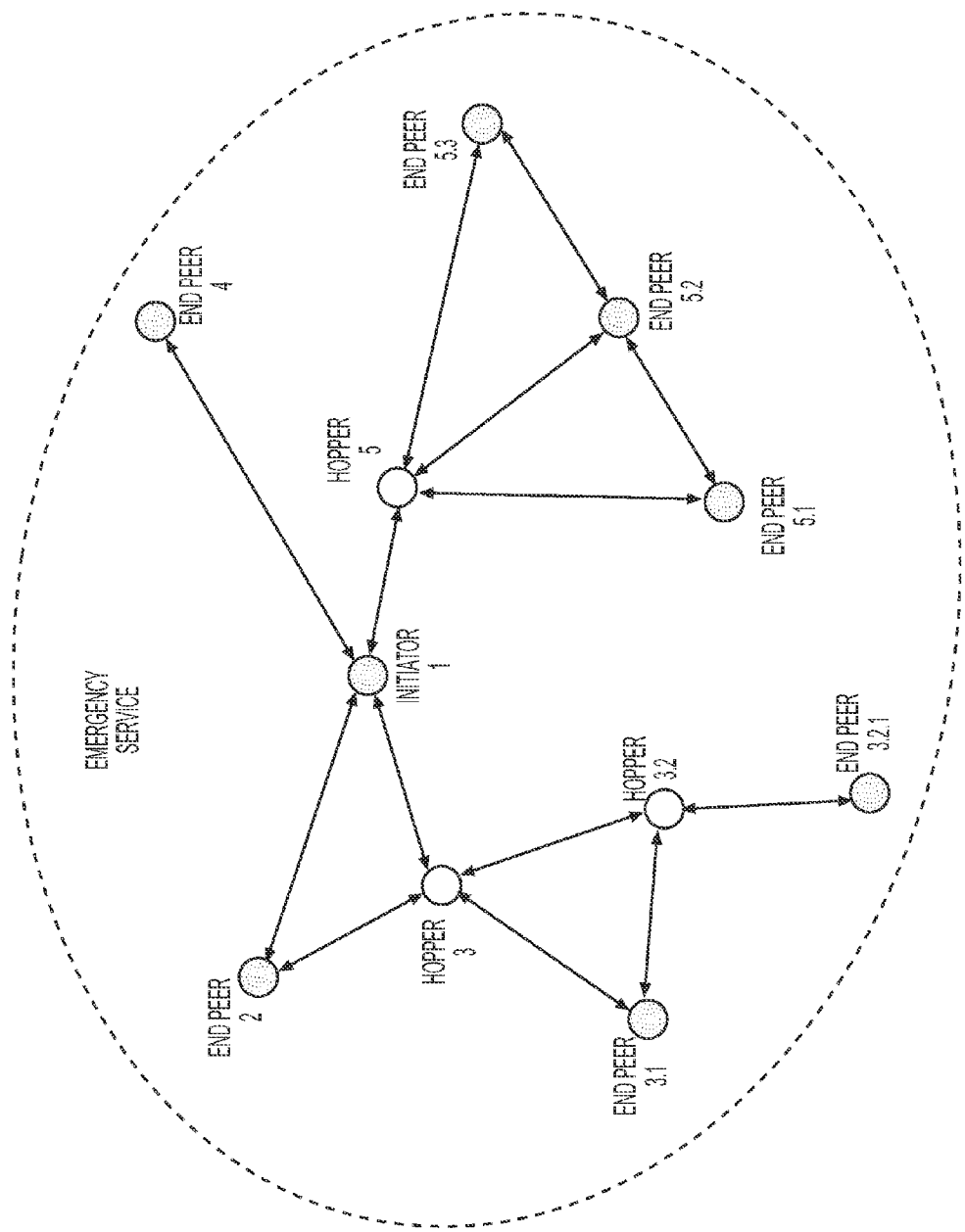

APPARATUS AND METHOD OF USING TIME REUSE FRAME STRUCTURES FOR MULTI-HOP COMMUNICATIONS

RELATED APPLICATIONS

This application claims priority to U.S. Provisional Patent Application No. 61/987,945, filed on May 2, 2014, titled, "Apparatus and Method of Using Time Reuse Frame Structures for Multi-hop communications" the contents of which are incorporated herein by reference in its entirety.

FIELD OF THE APPLICATION

The present application relates to apparatuses and methods for improving multi-hop communications. More specifically, the application relates to apparatuses and methods employing time reuse frame structures for multi-hop communications.

BACKGROUND

Generally, peer-to-peer (P2P) communication is based upon a peer's proximity for obtaining desired services in a wireless communication system. Depending upon its location, the peer may be too far to communicate with another peer. Multi-hop P2P communication may be employed to extend the proximity range in these instances.

Channel allocation schemes at the medium access control (MAC) layer, specifically in existing IEEE 802.11 and IEEE 802.15 standards, are known to exist for single-hop communication. However, with respect to multi-hop communication, improved channel allocation schemes based upon a centralized controller are still desired. Techniques for allocating channel resources for fully distributed and infrastructure-less multi-hop P2P communications are also desired.

Moreover, frame structures of a network may affect the performance of a multi-hop network. Among other things, performance may be based upon capacitance and latency. Presently, there is a deficiency in the field of endeavor for a frame structure that is capable of fully supporting multi-hop communication at the MAC layer, especially for fully distributed and infrastructure-less P2P networks.

What is desired in the art is an apparatus including a frame structure architecture which increases the capacity for multi-hop communications.

What is also desired in the art is a method of employing time reuse to improve multi-hop communication.

What is also desired in the art is a technique for allocating a channel for efficiently supporting fully distributed and infrastructure-less multi-hop P2P communications.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and apparatus for employing time reuse frame structures.

One aspect of the application is directed to a superframe structure for multi-hop communication comprising a first tier-frame and a second tier frame. The first tier-frame includes an initiator-subframe. The second tier-frame includes at least two hopper-subframes. Each of the at least two hopper-subframes includes a contention access period and a contention free period. The two hopper-subframes in the second tier-frame overlap in time. This allows peers to communicate with each other using the same channel without producing interference. Preferably, the superframe structure operates at the media access control level.

Another aspect of the application is directed to a superframe structure for multi-hop communication comprising at least a first, second, third and fourth tier-frame. The first tier-frame includes an initiator-subframe. The fourth tier-frame includes at least two hopper-subframes. Each of the at least two hopper-subframes includes a contention access period and a contention free period. Further, the initiator-subframe and one of the hopper-subframes in the fourth tier-frame are configured to overlap in time. Preferably, the tier-frames are located at least two tiers away.

Yet another aspect of the application is directed to a method for granting a hopper-subframe in a multi-hop network. An initiator is provided in the network. A hopper-subframe allocation request is received by a new peer. Next, it is determined whether to grant the hopper-subframe allocation request. Further, a hopper-subframe allocation response is sent to the peer. In one embodiment, the determining step includes evaluating if the requested hopper is in the same logical tier as the initiator hopper.

Yet even another aspect of the application is directed to a method for an existing hopper to update an allocated hopper-subframe in a multi-hop network. The method includes the step of sending a beacon to a new peer. Also, a channel allocation request is received from the new peer. Moreover, it is determined whether the request can be allocated to an existing subframe. In one embodiment, a hopper-subframe allocation request is sent to an initiator; and a hopper-subframe allocation response is received from the initiator.

A further aspect of the application is directed to a method for a hopper to allocate a new hopper subframe in a multi-hop network. The network includes a hopper and a hopper neighbor. It is determined whether a hopper-subframe in a tier frame may be allocated. Moreover, an allocated hopper-subframe to the hopper neighbor is broadcasted. In one embodiment, a tier frame increase notification is sent to an initiator. In a further embodiment, a subframe is allocated in the updated tier-frame.

There has thus been outlined, rather broadly, certain embodiments of the invention in order that the detailed description thereof may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 3B illustrates an embodiment of a multi-hop peer-to-peer communication employing an emergency alarm.

DETAILED DESCRIPTION OF THE ILLUSTRATIVE EMBODIMENTS

Figure 1A:
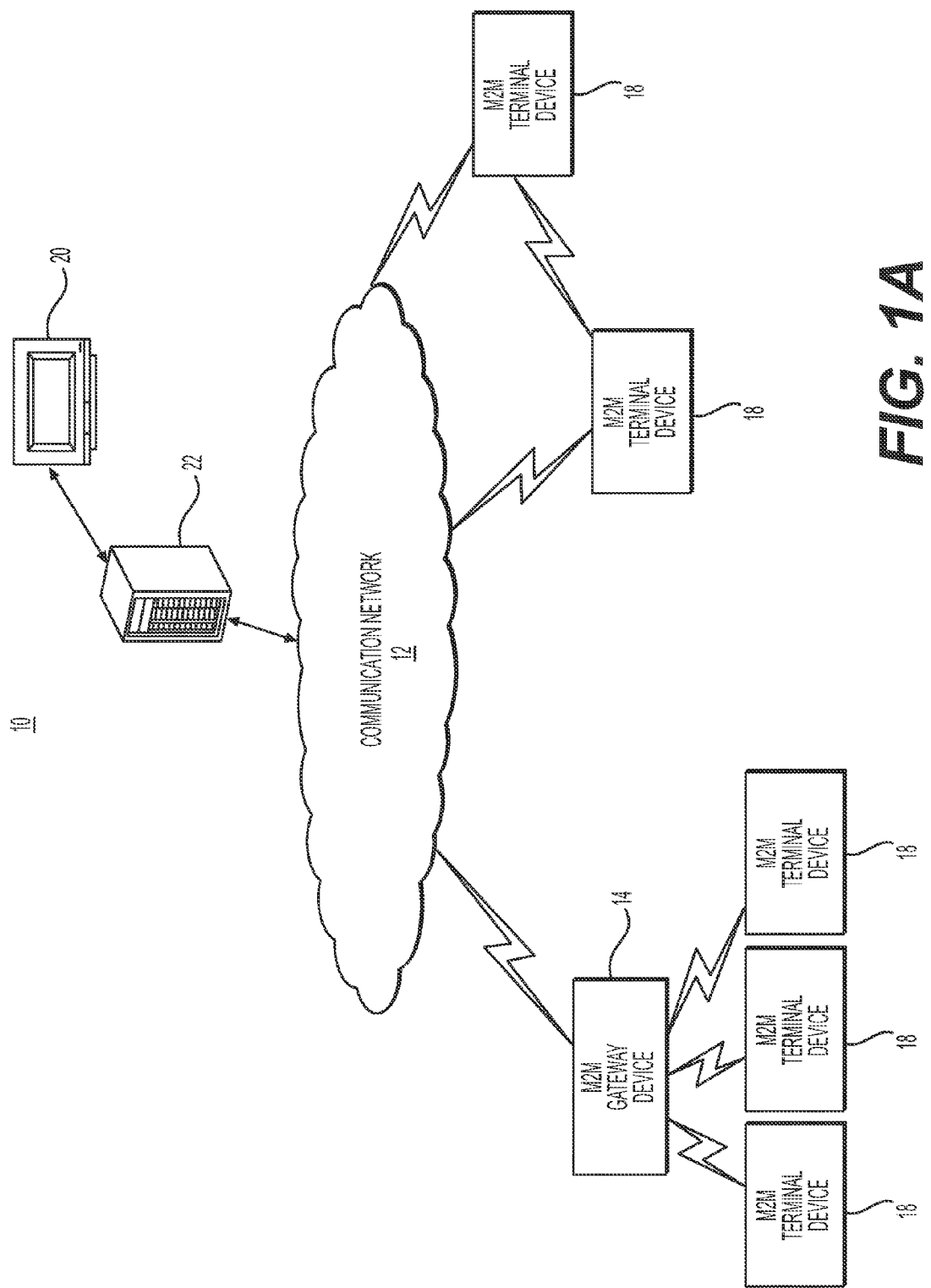
FIG. 1A is a block diagram of an example peer device that may be used in a peer-to-peer (P2P) communication system.

A detailed description of the illustrative embodiment will be discussed in reference to various figures, embodiments and aspects herein. Although this description provides detailed examples of possible implementations, it should be noted that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The present application describes new ways of improving multi-hop P2P communications at the MAC layer. Specifically, time reuse may be employed to ensure that an adequate distance or capacity exists between peers to support P2P communication. According to the application, it has been determined that two independent peers may achieve a P2P communication and can overlap in time so long as they are out of radio interference range from each other. As will be discussed in more detailed herein, time reuse may be employed to design the frame structures appropriately and also for allocating the channel to efficiently support multi-hop communications.

Common terms that will be used throughout this application include but are not limited to:

Peer-to-Peer (P2P) Communication: Infrastructure based or infrastructure-less communications among peers within proximity.

Peer: A user or device, or a group of users or devices sharing a group ID, e.g., a mobile station in 2G, a UE in 3G, or a group of FFDs or RFDs in IEEE802.15 (WPAN). In the multi-hop scenario, a peer could be an Initiator Peer, Hop Peer or End Peer.

Initiator: A peer who sends out a superframe beacon at the beginning of a superframe. Usually it is the first peer to initiate the first service or application in proximity.

Hop Peer: A peer that relays or hops messages or data to the other peers in proximity to extend the radio coverage. The terms "Hop Peer" and "Hopper" are interchangeable in this disclosure. A Hopper is also a peer to its Hopper associated in the hierarchical multi-hop topology.

End Peer: A peer that does not relay or hop any message or data to the other peers in proximity.

Initiator-subframe: A subframe allocated to the Initiator for communications among the Initiator and its peers.

Hopper-subframe: A subframe within a Tier-frame. A Hopper communicates with its peers within the Hopper-subframe allocated to it.

Tier-frame: A Tier-frame is a frame in a superframe. A Hopper has to allocate its Hopper-subframe inside of its Tier-frame.

Tier: A region bounded by two concentric circles centered at the Initiator, i.e., ring based divisions of two-dimensional space to guarantee peers in non-adjacent Tiers do not interfere with each other.

Tier-frame Number: An index of a Tier-frame in a superframe.

Tier Number: An index of a Tier to reflect the distance from the Initiator.

Sector: The angular divisions of Tiers to guarantee peers in non-adjacent sectors do not interfere with each other. Sectors in the same Tier have the same size.

Sector Number: An index of a Sector in a Tier. For a polar coordinate system centered at the Initiator, Sectors within a Tier can be numbered counter clockwise starting from azimuth 0.

Platforms

This application is intended to cover platform functionality and support for both application enablement platforms (AEPs) and connected device platforms (CDPs). AEPs include an application enablement layer and a service layer including the World Wide Web and Internet. The application enablement layer includes but is not limited to the following: (i) servicing APIs, rules/scripting engine; (ii) SDK programming interface; and (iii) enterprise systems integration. The application enablement layer may also include value-added services including but not limited to discovery, analytics, context and events. The service layer including the world wide web and Internet may comprise, for example, analytics, billing, raw APIs, web service interfaces, semantic data models, device/service discovery, device management, security, data collection, data adaptation, aggregation, event management, context management, optimized connectivity and transport, M2M gateway, and addressing and identification. The CDPs may include connectivity analysis, usage analysis/reporting/alerts, policy control, automated provisioning, SIM activation/deactivation, and subscription Activation/Deactivation.

General Architecture

Prior to discussing the methods and apparatuses of this application in full detail, a brief description of exemplary peer devices is provided.

FIG. 1A is a diagram of an exemplary machine-to-machine (M2M) or IoT communication system 10 in which one or more disclosed embodiments may be implemented. Generally, M2M technologies provide building blocks for the IoT, and any M2M device, gateway or service platform may be a component of the IoT as well as an IoT service layer, etc.

As shown in FIG. 1A, the M2M/IoT communication system 10 includes a communication network 12. The communication network 12 may be a fixed network or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular, as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN, e.g., Zigbee, 6LoWPAN, Bluetooth, direct radio link, and wireline for example. The illustrated M2M service platform 22 provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18 and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 1B:
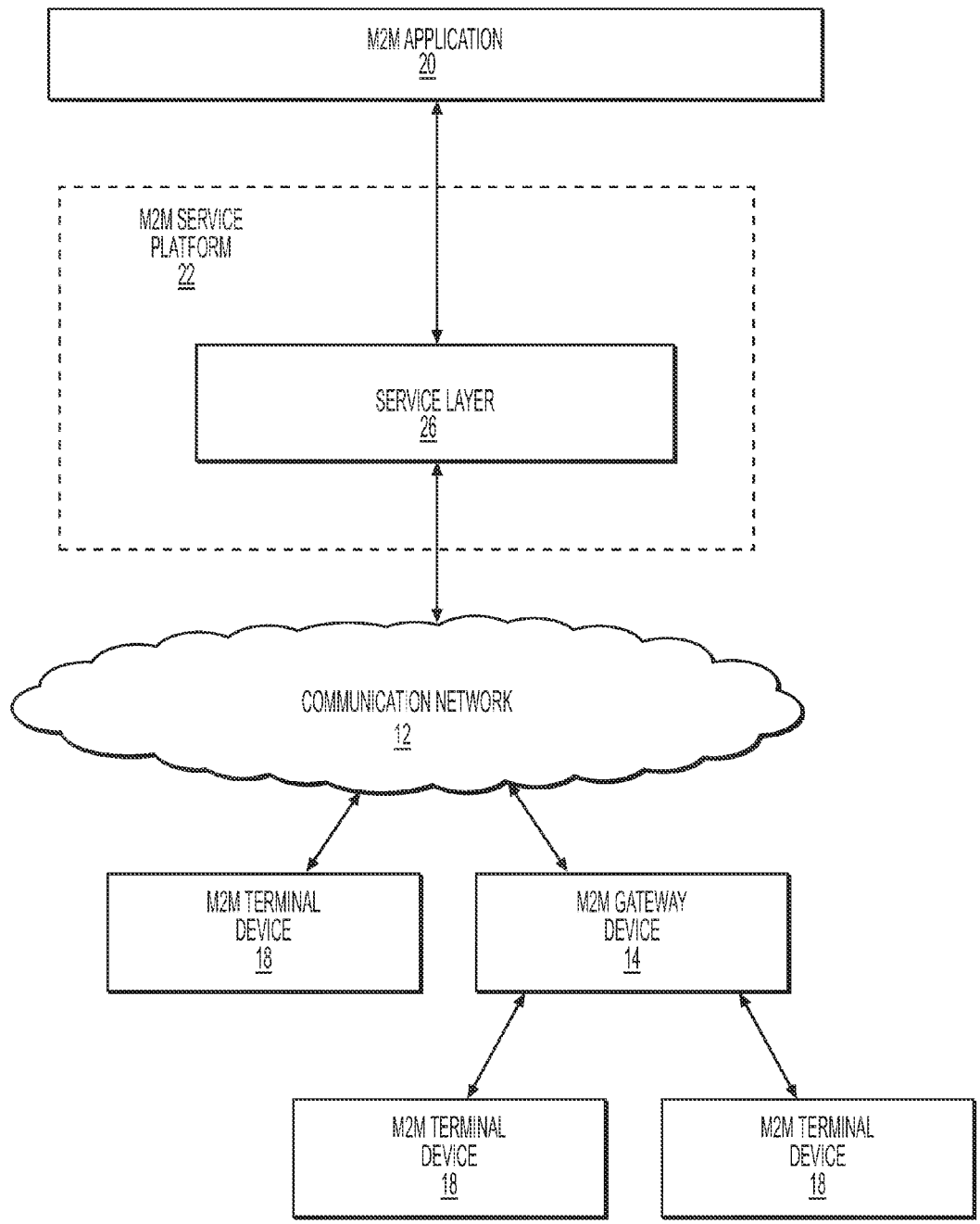
FIG. 1B is a block diagram of an example computing system in which aspects of the present application may be embodied.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, M2M gateway, etc.

Referring also to FIG. 1B, the M2M service platform typically implements a service layer 26, e.g., a network service capability layer (NSCL), that provides a core set of service delivery capabilities that diverse applications and verticals can leverage. These service capabilities enable M2M applications 20 to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'. Moreover, the M2M service layer may also be configured to interface with other devices such as mobile devices and M2M servers/gateways as discussed in this application and illustrated in the figures.

According to an aspect of the application, the method of managing registration may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node. Further, the method of searching and discovering service layers as described in the present application can be implemented as part of an M2M network that uses a Service Oriented Architecture (SOA) and/or a resource-oriented architecture (ROA) to access services related to management of discovery, registration and de-registration from a service layer.

Figure 1C:
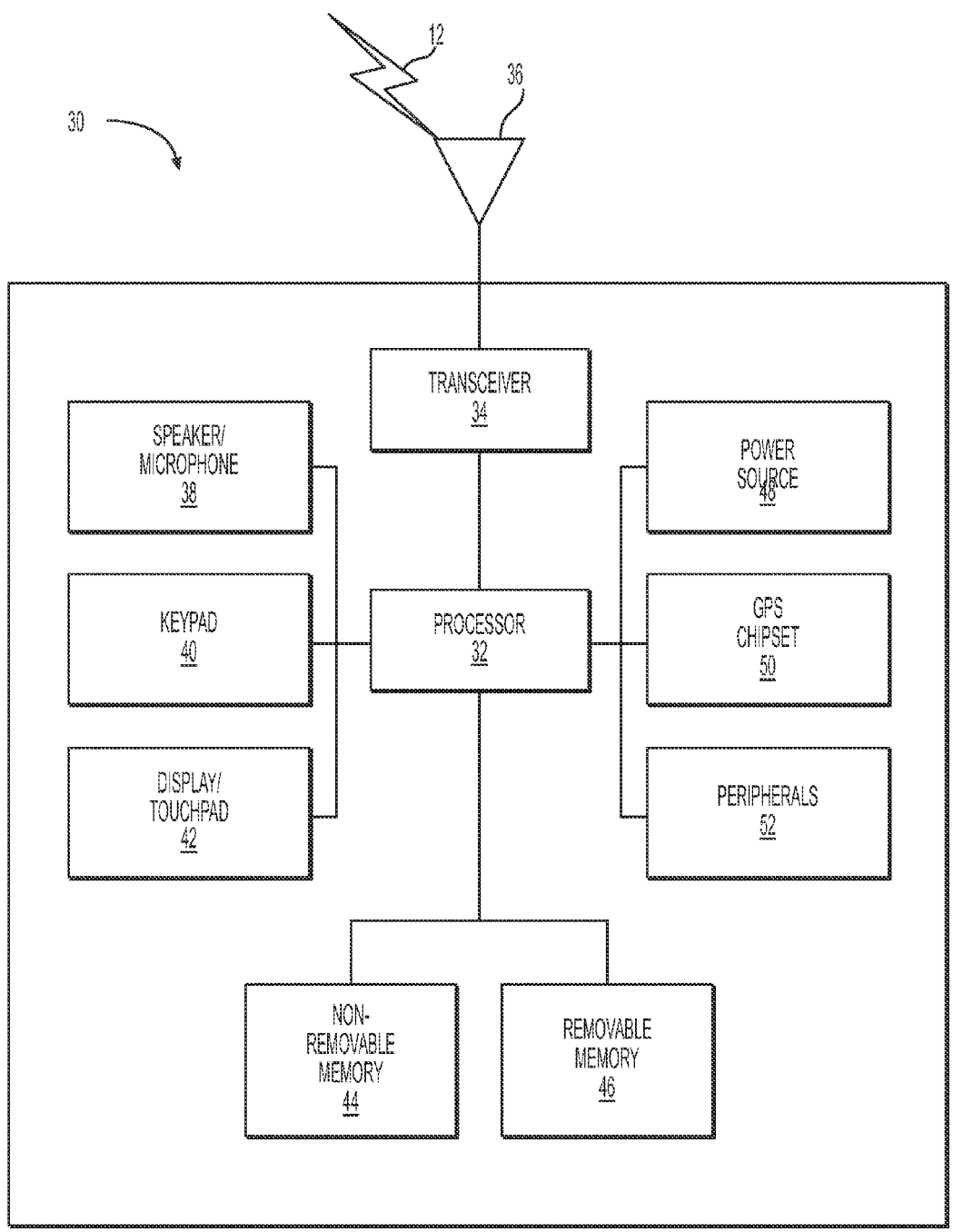

FIG. 1C is a system diagram of an example peer device 30, such as a MS in 2G, a UE in 3G, or a group of FFDs or RFDs in IEEE802.15 (WPAN). In the multi-hop scenario, a peer could be an Initiator Peer, Hop Peer or End Peer. The peer device 30 may include but is not limited to terminal devices, smart phones, tablets, phablets, smart office equipment, smart appliances and automobiles. As shown in FIG. 1C, the peer device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the peer device 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the peer device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications.

The processor 32 may perform security operations such as authentication, security key agreement, and/or cryptographic operations, such as at the access-layer and/or application layer for example.

The transmit/receive element 36 may be configured to transmit signals to, or receive signals from, another peer. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the peer device 30 may include any number of transmit/receive elements 36. More specifically, the peer device 30 may employ MIMO technology. Thus, in an embodiment, the peer device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the peer device 30 may have multi-mode capabilities. Thus, the transceiver 34 may include multiple transceivers for enabling the peer device 30 to communicate via multiple RATs, such as UTRA and IEEE 802.11 or 802.15, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the peer device 30, such as on a server or a home computer.

The processor 32 may receive power from the power source 48, and may be configured to distribute and/or control the power to the other components in the peer device 30. The power source 48 may be any suitable device for powering the peer device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the peer device 30. It will be appreciated that the peer device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
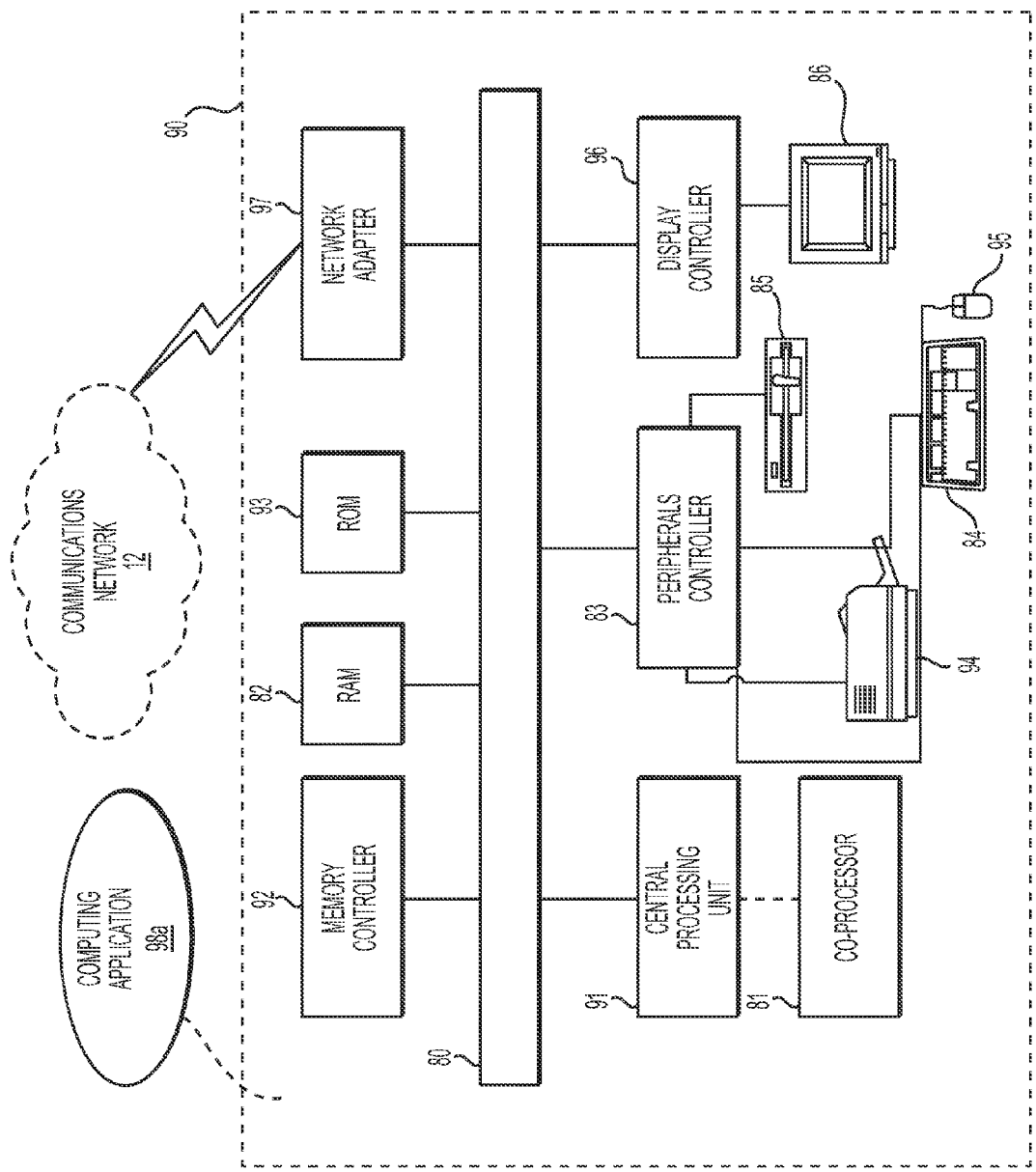

FIG. 1D is a block diagram of another embodiment of peer device 90. The peer device 30, or any other device, may include but is not limited to terminal devices, smart phones, tablets, phablets, smart office equipment, smart appliances and automobiles. In this embodiment, the peer device 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause peer device 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data in connection with P2P communications.

In operation, CPU 91 fetches, decodes, and executes instructions, and transfers information to and from other resources via the computer's main data-transfer path, system bus 80. Such a system bus connects the components in peer device 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, peer device 90 may contain peripheral controller 83 responsible for communicating instructions from CPU 91 to peripherals, such as printer 94, keyboard 84, mouse 95, and disk drive 85.

Display 86, which is controlled by display controller 96, is used to display visual output generated by peer device 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Further, peer device 90 may contain network adaptor 97 that may be used to connect peer device 90 to an external communications network.

It is understood that any or all of the systems, methods and processes described herein may be embodied in the form of computer executable instructions, e.g., program code, stored on a computer-readable storage medium which instructions, when executed by a machine, such as a computer, server, peer, processor, or the like, perform and/or implement the systems, methods and processes described herein. Specifically, any of the steps, operations or functions described herein may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Examples of Multi-Hop Communications

Figure 2:
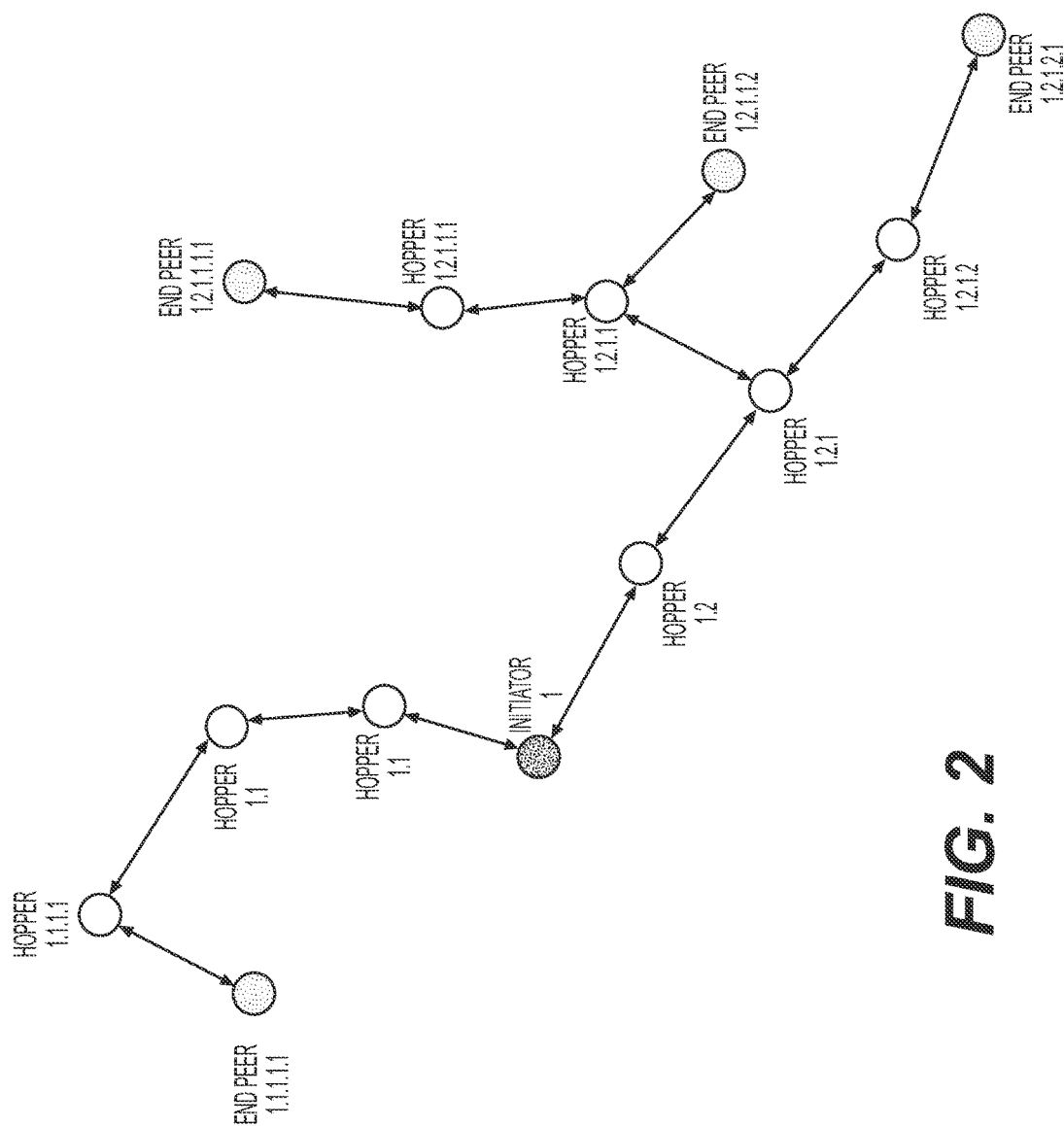
FIG. 2 illustrates an embodiment of a multi-hop topology.

As shown in FIG. 2, an example topology is illustrated to advance the idea of frame structures and multi-hop channel allocation procedures among an Initiator, Hopper and End peer. As shown, peer 1 is the Initiator, peers 1.1.1.1.1; 1.2.1.1.1.1; 1.2.1.1.2; and 1.2.1.2.1 are End Peers, and the remaining peers are Hoppers. Moreover, Table 1 below provides a description of different parameters that will be used in reference to the architecture of time reuse.

TABLE 1

| Parameter | Description |
|---|---|
| R | The radius of Tier 1, or the difference between outer radius and inner radius of Tier p (p > 1) |
| N | Number of non-overlap Tier-frames in a superframe |
| M | Number of Tier-frames overlapped |
| d | The distance between a peer and the Initiator |
| i | Tier-frame number |
| $I_h$ | Hopper's Tier-frame number |
| p | Tier number |
| $Sector_{p,q}$ | The $q^{th}$ Sector in Tier p |
| $ASet_{p,q}$ | Adjacent Sector Set of $Sector_{p,q}$ |
| $Sub_{i,s}$ | The $s^{th}$ Hopper-subframe in Tier-frame i |
| $PSet_{i,s}$ | Peers communicate in the $s^{th}$ Hopper-subframe in Tier-frame i |
| $SSet_{i,s}$ | Sector Set of the $s^{th}$ Hopper-subframe in Tier-frame i |
| $ISet_{i,s}$ | Interference Sector Set of the $s^{th}$ Hopper-subframe in Tier-frame i |

Figure 3A:
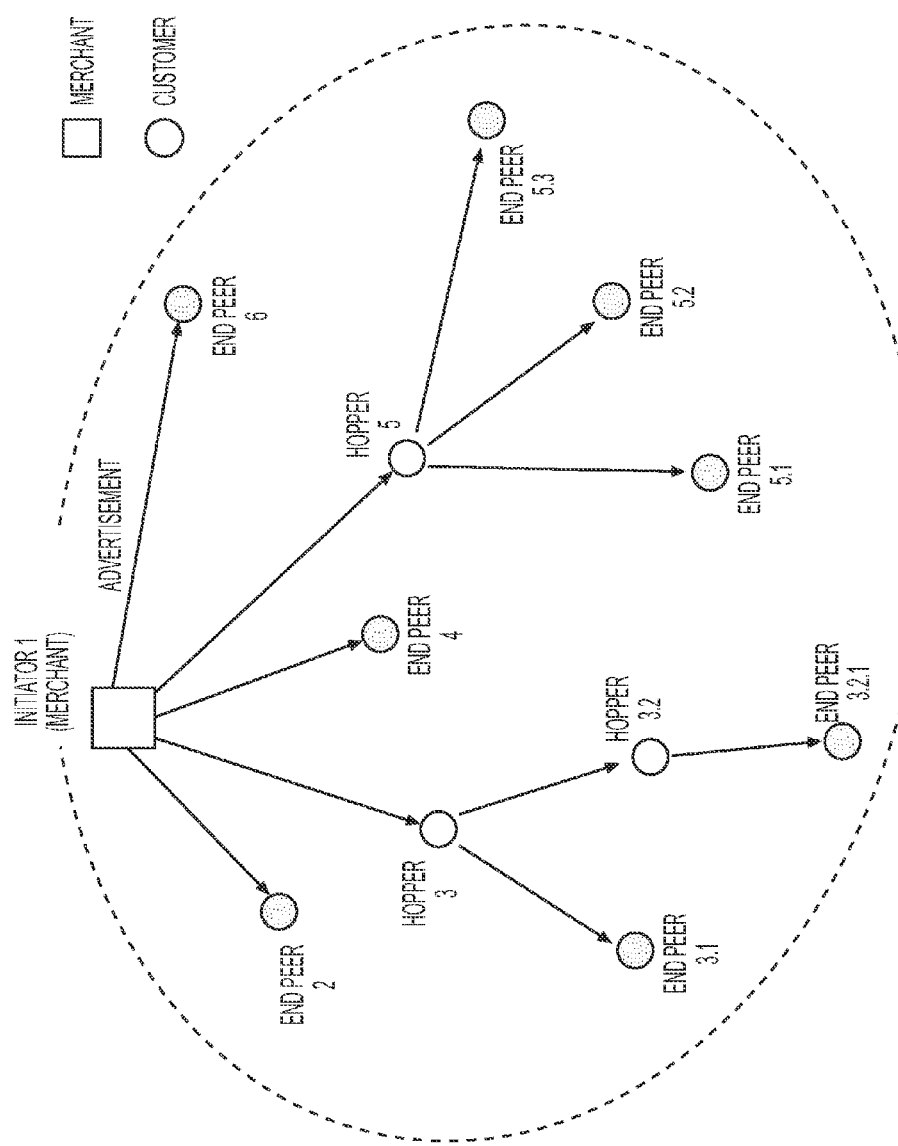
FIG. 3A illustrates an embodiment of a multi-hop peer-to-peer communication employing an advertisement.

Multi-hop P2P communications are considered useful to extend the range of the proximity communications. Examples of multi-hop P2P communication includes but is not limited to advertisements, security and safety alerts, and network of networks, e.g., mufti-hop to infrastructure, offloading from infrastructure and up loading to hot spots. In one example as shown in FIG. 3A, an initiator is a merchant (Square) sending an advertisement to one or more peers (circle). The merchant may be located in a shopping mall. Due to the proximity of some end peers, a hopper (e.g., hoppers 3, 3.2 and 5) is required to transmit the advertisement to end peers (e.g., end peers, 3.1, 3.2.1, 5.1, 5.2 and 5.3).

According to another example as shown in FIG. 3B, an emergency service is disclosed. The service may include but is not limited to a hazard warning, emergency alarming, police or public safety service intended to reach as many peers as possible via the multi-hop. Here, Initiator 1 sends an alert directly or indirectly through hoppers to the end peers in the system. End peers may send messages to other end peers (e.g., End peer 5.1 to End peer 5.2) as well as to Hoppers (e.g., End peer 5.1 to Hopper 5). Moreover, hoppers may send alerts to further hoppers in order to reach an End peer (e.g., Hopper 3 to Hopper 3.2 to End peer 3.2.1).

The Initiator maintains information for a Hopper-subframe which contains all allocated Hopper-subframes in the network. This information is provided in Table 2 below.

TABLE 2

| FIELD | DESCRIPTION |
| --- | --- |
| Tier-frame number | Tier-frame number of the Hopper-subframe |
| Start Offset | Start time/slot of the Hopper-subframe from the beginning of its Tier-frames. |
| End Offset | End time/slot of the Hopper-subframe from the beginning of its Tier-frames. |
| PSet | Peer Set of the Hopper-subframe |
| SSet (optional) | Sector Set of the Hopper-subframe |
| ISet (optional) | Interference Set of the Hopper-subframe |
| Hopper's MAC Address | MAC address of the Hopper who owns the Hopper-subframe |

Frame Structure for Inter-Tier Time reuse

Figure 4:
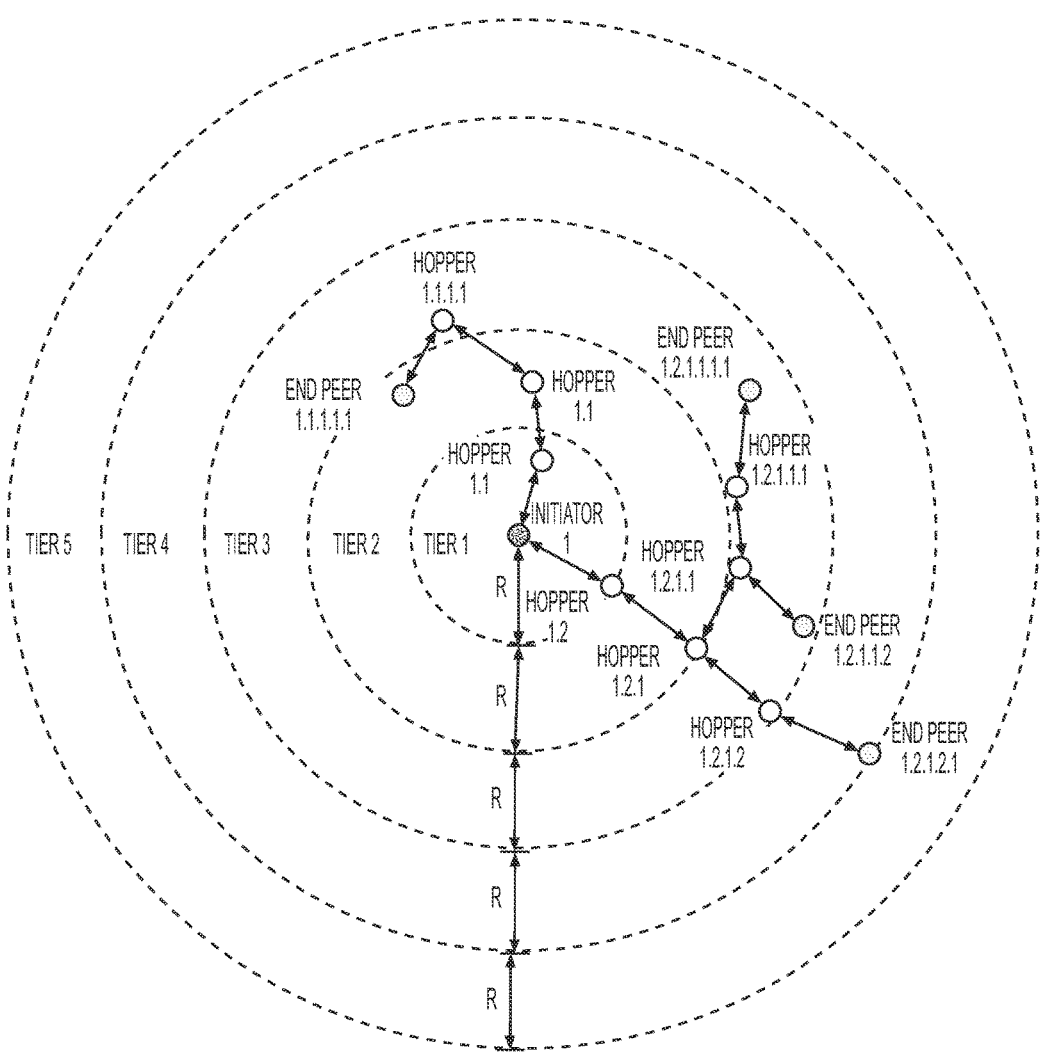
FIG. 4 illustrates an embodiment of a multi-hop frame structure with time reuse.

According to one embodiment, there is disclosed a tier based frame structure for inter-tier time reuse. As shown in FIG. 4, the network may be divided into tiers. The tiers are numbered, such as for example, Tier 1, Tier 2, Tier 3, Tier 4 and Tier 5. Further tiers are envisaged in accordance with this application. The division of the tiers ensures that peers in non-adjacent tiers will not interfere with each other. The Initiator is denoted as Tier 0 and is located at the center of all Tiers. For example, the area provided by Tier 1 is a circle with radius R. The center of this tier or circle includes an Initiator. According to this application, all peers located in this range are in Tier 1 except for the Initiator located at the center.

The region defined for each additional tier beyond Tier 1, e.g., p=p>1, is bounded by two concentric circles centered at the Initiator. The radius of the larger circle is p*R and the radius of the smaller circle is (p−1)*R. Accordingly, a peer is located in Tier p (p>0) if its distance from the Initiator is within the range [(p−1)R, p*R]. Moreover, the minimum value of R, $R_{min}$, is the maximum transmission range allowed of all peers in the network, which is calculated by the formula:

$$R_{min} = f_{PL}^{-1}(P_{max}, P_r, \ldots) \quad (1)$$

wherein, $P_{max}$ is the maximum transmission power allowed for the application in the network, $P_r$ is the receiver sensitivity for peers in the network, and $f_{PL}^{-1}$ is the inverse of the Path Loss function.

In an exemplary embodiment, some values $R_{min}$ of using the IEEE 802.15.8 Path Loss function are provided in Table 3 below.

TABLE 3

| $R_{min}$ (meter) | Maximum transmission power for the application (dBm) | Receiver sensitivity (dBm) |
| --- | --- | --- |
| 52 | 10 | −82 |
| 57 | 20 | −82 |
| 61 | 20 | −92 |

Figure 5:
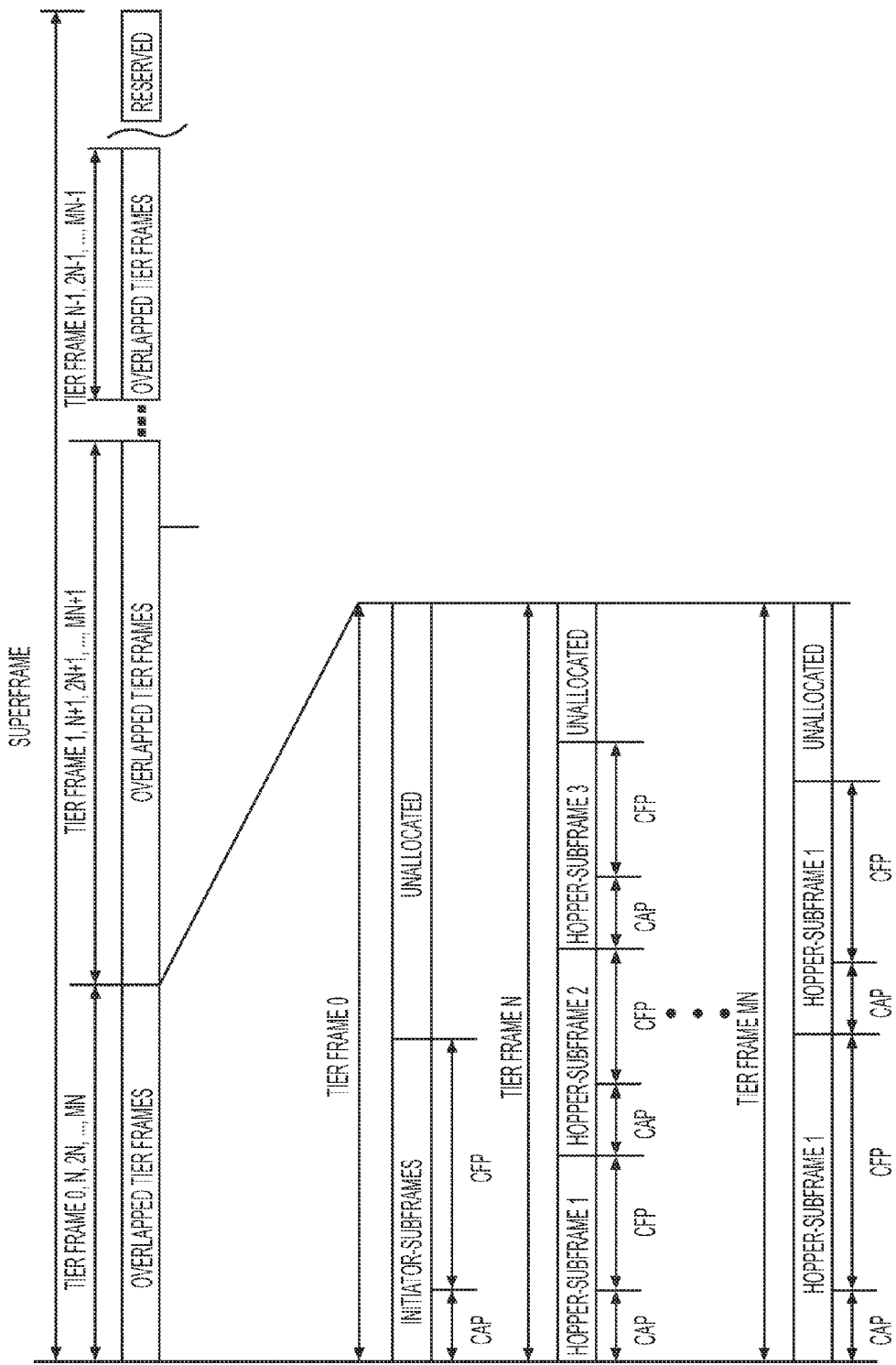
FIG. 5 illustrates an embodiment of a Tier Based Frame Structure.

According to this application, it has been determined that peers in different Tiers that are located at least two Tiers away from each other can use the same channel without interfering with each other. For example peers in Tier 1 and peers in Tier 4 can communicate simultaneously without interfering with each other. In one embodiment, a tier-based frame structure is provided as shown in FIG. 5. Here, a superframe includes one or more Tier-frames and/or reserved frames. A Tier-frame may include several Hopper-subframes and/or unallocated subframes. Tier-frame 0 has an Initiator-subframe and/or unallocated subframe.

The Tier-frames and reserved frames are configured to overlap in time. For example, Tier-frame p and Tier-frame p' can overlap in time, if $$p = p' \pmod{N} \quad (2)$$

where N is the number of non-overlapped Tier-frames in a superframe.

Assuming N is equal to 3, Tier-frames 0, 3 and M×N may overlap in time. By so doing, the Initiator may communicate with Hopper 1.1. In turn, Hopper 1.2.1.2 may communicate with End Peer 1.2.1.2.1. Both of these communications may occur simultaneously without interfering with each other.

According to this application, peers are capable of knowing their own location, e.g., geographic coordinates or relative location via Geographic Coordinate System (GPS) or Inertial Navigation System (NS). The Initiator periodically broadcasts its current location to all peers in the network via Hoppers. When a peer receives a Superframe Beacon or Hopper Beacon, it can update its Tier number p, according to the formula:

$$p = [d/R] \quad (3)$$

where d is the distance between the peer and the Initiator, and where R is the radius of the circle.

According to another embodiment, the Initiator may send a Superframe Beacon at the beginning of a Superframe. The Superframe beacon may contain but is not limited to fields set forth in Table 4 below. The offset in Table 4 may be slots of time. The Initiator and its peers may communicate within the Initiator-subframe.

TABLE 4

| FIELD | DESCRIPTION |
| --- | --- |
| Initiator location | Indicate the location, e.g., geographic coordinates or relative location (e.g. via GPS or INS). |
| R | The radius of Tier 1, or the difference between outer radius and inner radius of Tier p (p > 1) |
| N | Number of non-overlapped Tier-frames in a superframe |
| Tier-frame 1 start offset | Indicate the offset from the beginning of the superframe to the start of Tier-frame 1 |
| Tier-frame 1 end offset | Indicate the offset from the beginning of the superframe to the end of Tier-frame 1 |

TABLE 4-continued

| FIELD | DESCRIPTION |
| --- | --- |
| Tier-frame N-1 start offset | Indicate the offset from the beginning of the superframe to the start of Tier-frame N-1 |
| Tier-frame N-1 end offset | Indicate the offset from the beginning of the superframe to the end of Tier-frame N-1 |
| Contention Access Period (CAP) start offset (optional) | Indicate the offset from the beginning of Initiator-subframe to the start of CAP |
| CAP end offset (optional) | Indicate the offset from the beginning of Initiator-subframe to the end of CAP |
| Contention Free Period (CFP) start offset (optional) | Indicate the offset from the beginning of Initiator-subframe to the start of CFP |
| CFP end offset (optional) | Indicate the offset from the beginning of Initiator-subframe to the end of CFP |

A Hopper in Tier p will allocate a Hopper-subframe in Tier-frame p. The Hopper sends a Hopper-beacon at the beginning of the allocated Hopper-subframe. The Hopper beacon includes but is not limited to the fields provided in Table 5. The offset in Table 5 may be slots of time. The Hopper and its peers communicate within its Hopper-subframe.

TABLE 5

| FIELD | DESCRIPTION |
| --- | --- |
| Initiator location | Indicate the location, e.g. geographic coordinates or relative location (e.g. via GPS or INS). |
| Hopper's Tier-frame number | Indicate the Tier-frame number of the Hopper. The field is set to 0 for Superframe Beacon |
| R | The radius of Tier 1, or the difference between outer radius and inner radius of Tier p (p > 1) |
| Beacon start offset | Indicate the offset of the beacon from the start of its Tier-frame. |
| Next Tier-frame offset | Indicate the offset of next Tier-frame from the beacon |
| N (optional) | Number of non-overlapped Tier-frames in a superframe |
| Tier-frame 1 start offset | Indicate the offset from the beginning of the superframe to the start of Tier-frame 1 |
| Tier-frame 1 end offset | Indicate the offset from the beginning of the superframe to the end of Tier-frame 1 |
| Tier-frame N-1 start offset | Indicate the offset from the beginning of the superframe to the start of Tier-frame N-1 |
| Tier-frame N-1 end offset | Indicate the offset from the beginning of the superframe to the end of Tier-frame N-1 |
| CAP start offset (optional) | Indicate the offset from the beginning of Hopper-subframe to the start of CAP |
| CAP end offset (optional) | Indicate the offset from the beginning of Hopper-subframe to the end of CAP |
| CFP start offset (optional) | Indicate the offset from the beginning of Hopper-subframe to the start of CFP |
| CFP end offset (optional) | Indicate the offset from the beginning of Hopper-subframe to the end of CFP |

According to another embodiment, a method of calculating a Tier number and Tier-frame number after receiving a beacon is disclosed. The method is useful in situations where the peer's Hopper is in a different Tier that is located further away from the Initiator.

In this embodiment, the Tier-frame number of the Initiator is 0. The Tier-frame number of peers that can hear the Superframe Beacon is 1. Moreover, a peer that cannot hear the Superframe Beacon will define its Tier-frame number 'i' according to its Tier number p and Tier-frame number of its Hopper '$I_h$'. By so doing, it is ensured that a peer cannot obtain a Tier-frame number smaller than its Hopper.

Figure 6:
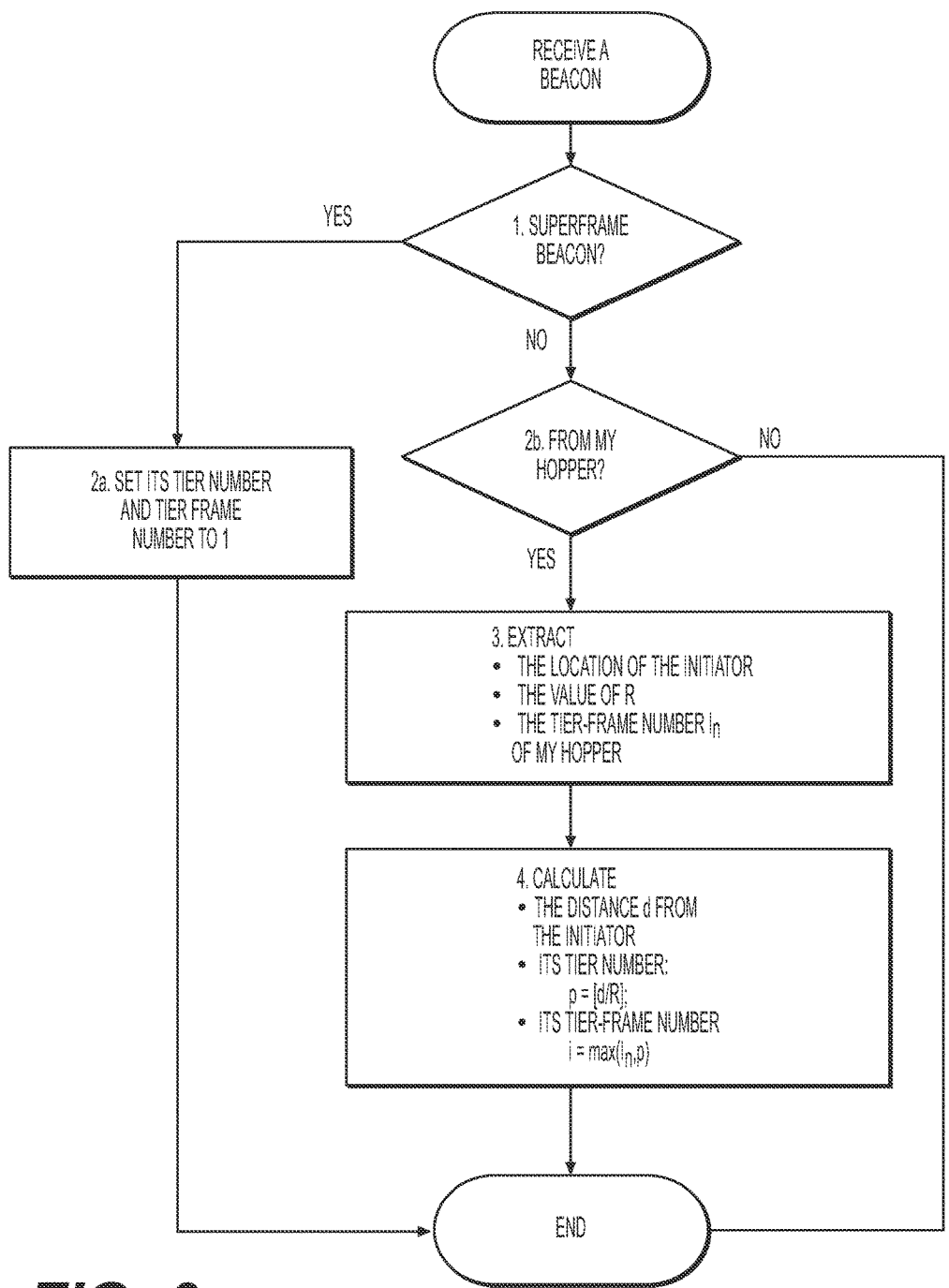
FIG. 6 illustrates an embodiment of a Peer updating and/or obtaining its Tier-frame number after receiving a beacon.
Figure 7:
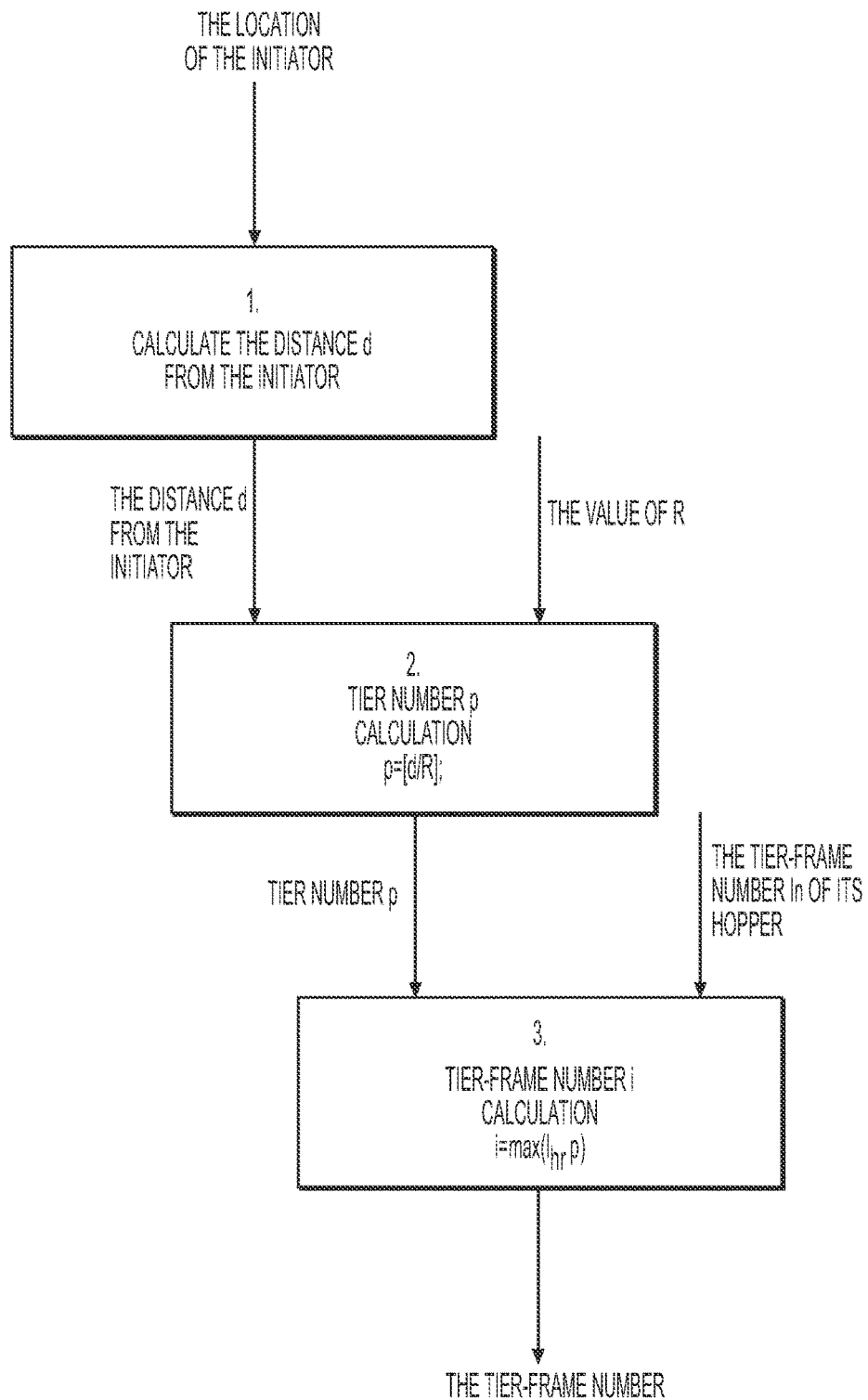
FIG. 7 illustrates an exemplary embodiment of the calculating step illustrated in FIG. 6.

According to the method as disclosed in FIG. 6, each of the steps is denoted by a numeral, e.g., 1, 2, etc. As an initial matter, the peer determines whether the received Beacon is a Superframe Beacon (Step 1). If so, the peer sets its Tier number and Tier frame number to 1 (Step 2a). Otherwise, the peer checks the sender of the Beacon. If the Beacons are not from a Hopper, the process ends. If the peer determines that the Beacon is from a Hopper, it extracts the location of the Initiator, the value of R and the Tier-frame number of its Hopper $I_h$ (Step 3). Subsequently, the peer calculates the distance from the Initiator, its Tier number p=[d/R] and its Tier-frame number 'i' as the maximum value of its Tier number p and its Hopper's Tier-frame number $I_h$ (Step 4). The calculations of Step 4 are further shown in FIG. 7 where each step is denoted by a numeral, e.g., 1, 2, etc. Namely, the distance from the initiator is calculated (Step 1). Next, tier number p is calculated based upon the distance divided by the value R (Step 2). Next the Tier-frame number i calculated based upon the maximum value of ($I_h$, p), wherein $l_h$ is the tier-frame number of its hopper (Step 3). By so doing, the tier frame number is obtained.

In a further embodiment, it is envisaged that a peer is prevented from obtaining a Tier-frame number smaller than its Hopper. In this case, peers choose another peer having the smallest Tier-frame number among its neighbors as its Hopper. For example, as illustrated in FIG. 4, when peer 1.1.1.1.1 is located in Tier 2, its Tier-frame number is 3. This is attributed to its Hopper's Tier-frame number being 3. As such, peer 1.1.1.1.1 will request a Hopper-subframe in Tier-frame 3 when it becomes a Hopper.

Hopper-subframe Structure for Intra-Tier Time Reuse

According to another embodiment, the application describes an alternative architecture configured to employ the concept of time reuse in order to improve multi-hop P2P communication. Namely, Hopper-subframes within the same Tier may overlap in time if peers in any of the other Hopper-subframes do not interfere with peers in all of the other Hopper-subframes. This concept is referred to as Intra-Tier Time reuse.

Figure 8:
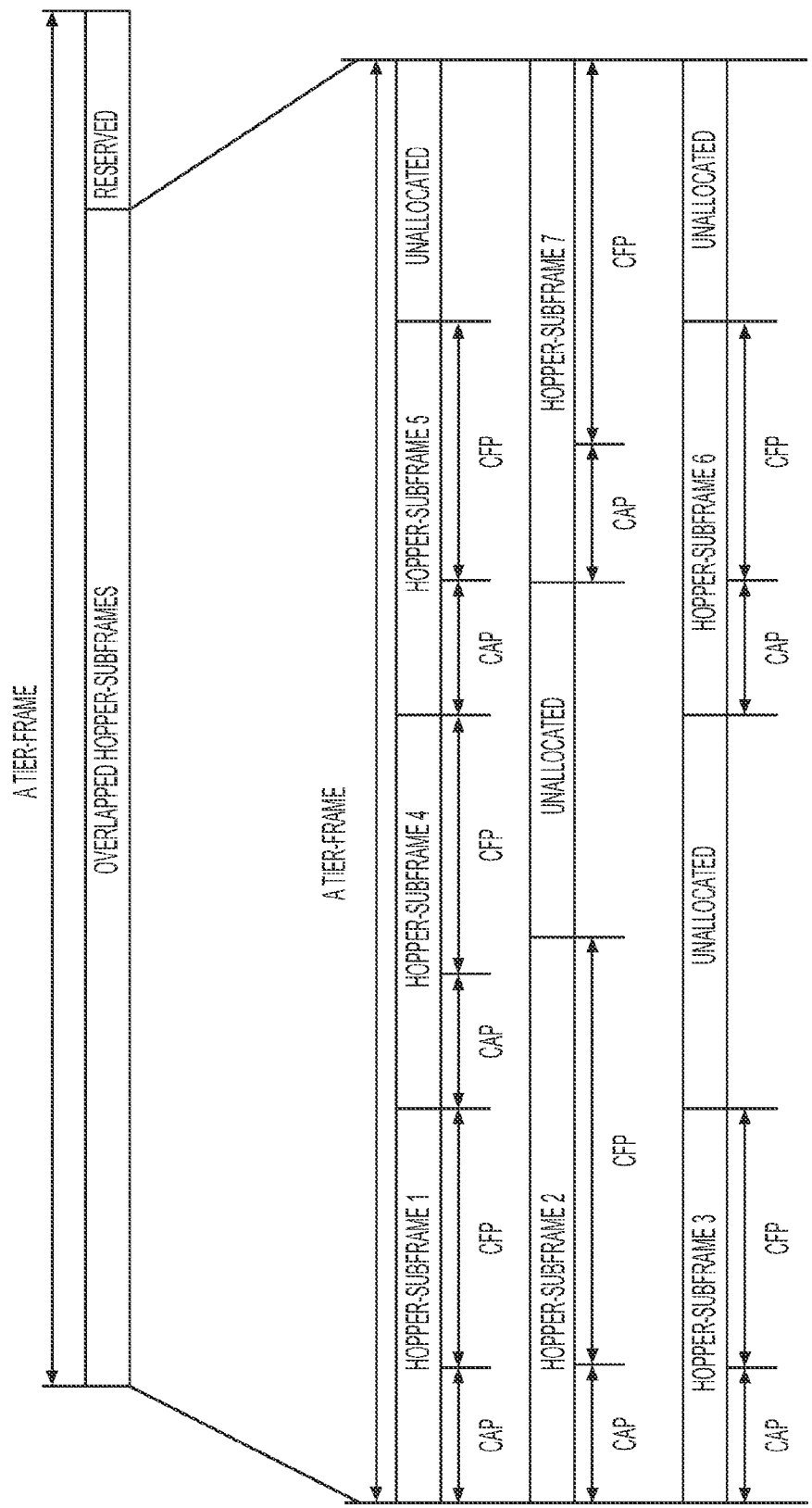
FIG. 8 illustrates an embodiment of a Hopper-subframe structure for Intra-Tier time reuse.

For example, FIG. 8 describes a Hopper-subframe structure. The Tier-frame includes overlapped Hopper-subframes and reserved frames. The overlapped Hopper-subframes include a Tier-frame. The Tier frame includes Hopper-subframes and unallocated areas. Each of the Hopper sub-frames includes a Contention Access Period (CAP) and a Contention Free Period (CFP).

Figure 9:
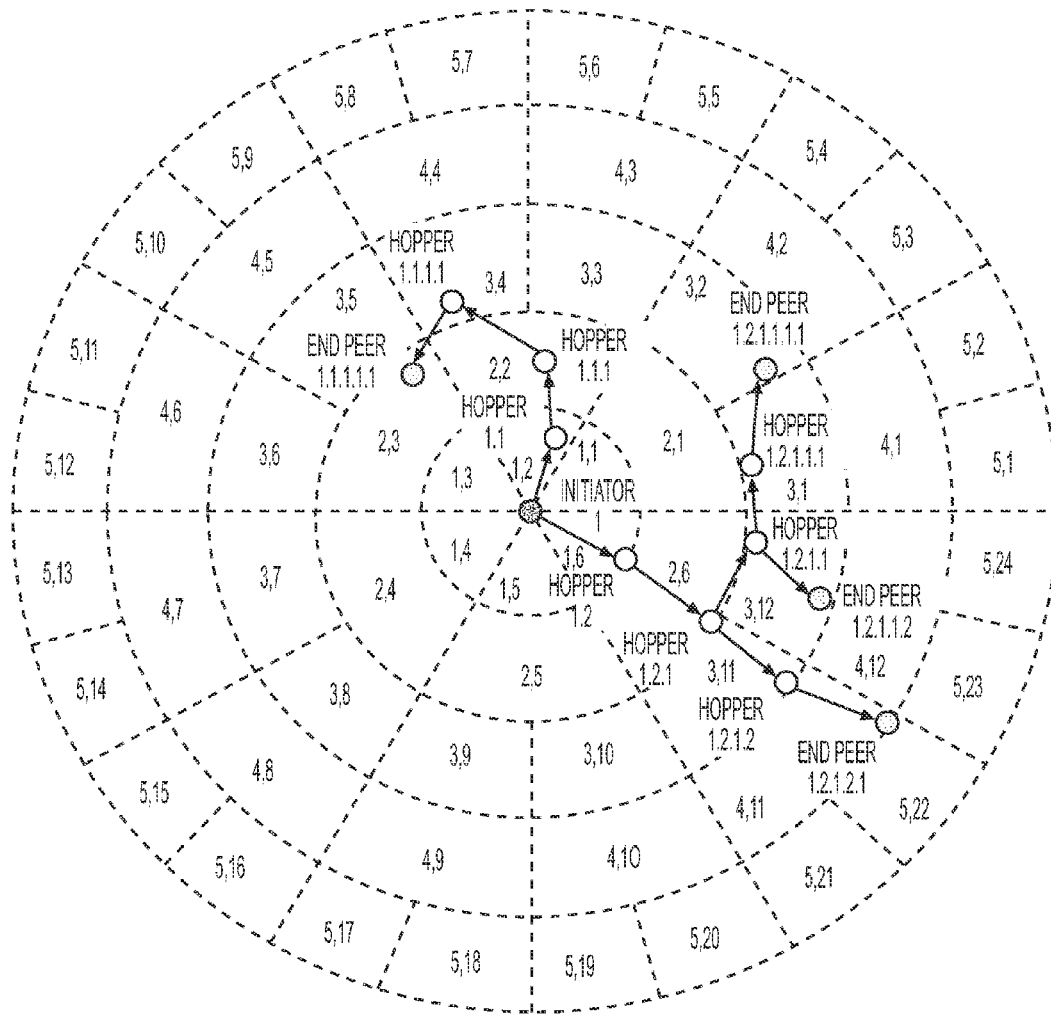
FIG. 9 illustrates another embodiment of a multi-hop frame structure with time reuse including sectors.

According to the present application, it may be determined whether two Hopper-subframes can overlap. FIG. 9 illustrates one or more Tiers divided into several uniform sectors. The sectors may be divided into the Tier p as: $3 \times 2^{[p/2]}$ sectors.

According to this embodiment, Tier 0 is not divided into sectors. By so doing, this division guarantees the shortest distance between non-adjacent boundary lines of a sector is always larger than R.

In yet another embodiment, the sector based time reuse architecture may employ one or more of the following rules in accordance with peers knowing who their Hoppers are. For example, sectors within a Tier can be numbered counter-clockwise starting from azimuth 0 if a polar coordinate is employed for selecting the Initiator as the pole. In addition, the $q^{th}$ sector in Tier p may be denoted as $Sector_{p,q}$. For example, $Sector_{4,2}$ is the $2^{nd}$ Sector in Tier 4. Moreover, peers on the boundary of two sectors in the same Tier always choose the sector with the smaller index number. Further, peers will obtain or update its sector number when it receives a Hopper beacon from its Hopper or a Superframe beacon from the Initiator.

The following terms and concepts may be employed after dividing the space into sectors:

Adjacent Sector: Two sectors are adjacent if they have a common line or point on the boundary.

Adjacent Sector Set ($ASet_{p,q}$): Each sector $Sector_{p,q}$ has an Adjacent Sector Set $ASet_{p,q}$ which contains all Sectors that are adjacent to it.

If p and q are odd, then $ASet_{p,q} = \{Sector_{p-1,(q-1)/2}, Sector_{p-1,(q+1)/2}, Sector_{p,q-1}, Sector_{p,q+1}, Sector_{p+1,q-1}, Sector_{p+1,q}, Sector_{p+1,q+1}\}$;

If p is odd and q is even, then $ASet_{p,q} = \{Sector_{p-1,q/2}, Sector_{p-1,q/2+1}, Sector_{p,q-1}, Sector_{p,q+1}, Sector_{p+1,q-1}, Sector_{p+1,q}, Sector_{p+1,q+1}\}$;

If p is even, then $ASet_{p,q} = \{Sector_{p-1,q-1}, Sector_{p-1,q}, Sector_{p-1,q+1}, Sector_{p,q-1}, Sector_{p,q+1}, Sector_{p+1,2q-2}, Sector_{p+1,q-1}, Sector_{p+1,2q}, Sector_{p+1,2q+1}\}$;

For example, the Adjacent Sectors Set of $Sector_{4,2}$ would be $ASet_{4,2} = \{Sector_{3,1}, Sector_{3,2}, Sector_{3,3}, Sector_{4,1}, Sector_{4,3}, Sector_{5,2}, Sector_{5,3}, Sector_{5,4}, Sector_{5,5}\}$. Peers in $Sector_{4,2}$ will not interfere with peers that are not in its sector and Adjacent Sectors Set, since the shortest distance between non adjacent boundary lines of a sector is always larger than R.

Peer Set ($PSet_{i,s}$): The $s^{th}$ Hopper-subframe in Tier-frame i has a Peer Set $PSet_{i,s}$ which contains all peers that communicate in the Hopper-subframe. As shown in FIG. 9, for example, the PSet of the Hopper-subframe allocated to Hopper 1.2.1.1.1 is: {Hopper 1.2.1.1.1., End Peer 1.2.1.1.1.1}. Each Hopper is allocated a Hopper-subframe in its Tier-frame, e.g., Tier-frame i, for communication among peers in its PSet.

Sector Set ($SSet_{i,s}$): The $s^{th}$ Hopper-subframe in Tier-frame i has a Sector Set $SSet_{i,s}$ which is the union of sectors of all peers in its $PSet_{i,s}$. For example, as shown in FIG. 9, the Sector Set of Hopper-subframe allocated to Hopper 1.2.1.1.1 is: $\{Sector_{3,1}, Sector_{3,2}\}$.

Interference Sector Set ($ISet_{i,s}$): The $s^{th}$ Hopper-subframe in Tier-frame i has an Interference Sector Set $ISet_{i,s}$, which is the union of Adjacent Sectors Set of peers in its $PSet_{i,s}$. For example, as shown in FIG. 9, the Interference Sector Set of Hopper-subframe allocated to Hopper 1.2.1.1.1 is: $ASet_{3,1} \cup ASet_{3,2} = \{Sector_{2,1}, Sector_{2,2}, Sector_{2,6}, Sector_{3,1}, Sector_{3,2}, Sector_{3,3} Sector_{3,12}, Sector_{4,1}, Sector_{4,2}, Sector_{4,3}, Sector_{4,12}\}$. Accordingly, Peers that communicate in Hopper 1.2.1.1.1 subframe as shown in FIG. 8 will not interfere with peers that are not in the Interference Set. That is, two Hopper-subframes $Sub_{i,s}$ and $Sub_{i,s'}$ in the same Tier frame can overlap in time, if and only if, peers that communicate in Hopper-subframe $Sub_{i,s}$ do not interfere with peers that communicate in Hopper-subframe $Sub_{i,s'}$. In others words, two Hopper-subframe $Sub_{i,s}$ and $Sub_{i,s'}$ can overlap in time if either: (i) no peers that communicate in Hopper-subframe $Sub_{i,s}$ is in $ISet_{i,s'}$, i.e. $SSet_{i,s} \cap ISet_{i,s'} = \emptyset$; or (ii) no peers that communicate in Hopper-subframe $Sub_{i,s'}$ is in $ISet_{i,s}$, i.e. $SSet_{i,s'} \cap ISet_{i,s} = \emptyset$).

A Centralized Technique to Form a Tier Based Frame Structure

According to another aspect of the application, a centralized technique to form a tier based frame structure is described. In the centralized technique, the Initiator takes a primary role to form the frame structure of the network. The Initiator first uses Tier-frame 0 to allocate a channel resource for its peers in Tier 1.

According to a further aspect of the application, there is disclosed a method for a peer in Tier 'i' that wants to become a new Hopper to request a Hopper-subframe in Tier frame i. The new Hopper communicates with other Hoppers via its Hopper-subframe, and also communicates with its peers in the Hopper-subframe allocated to it in its Tier frame. In an exemplary embodiment as shown in FIG. 9, peer 1.2.1.2 may desire to become a "new Hopper." This may be triggered by peer 1.2.1.2.1 selecting it as a Hopper.

Figure 10A:
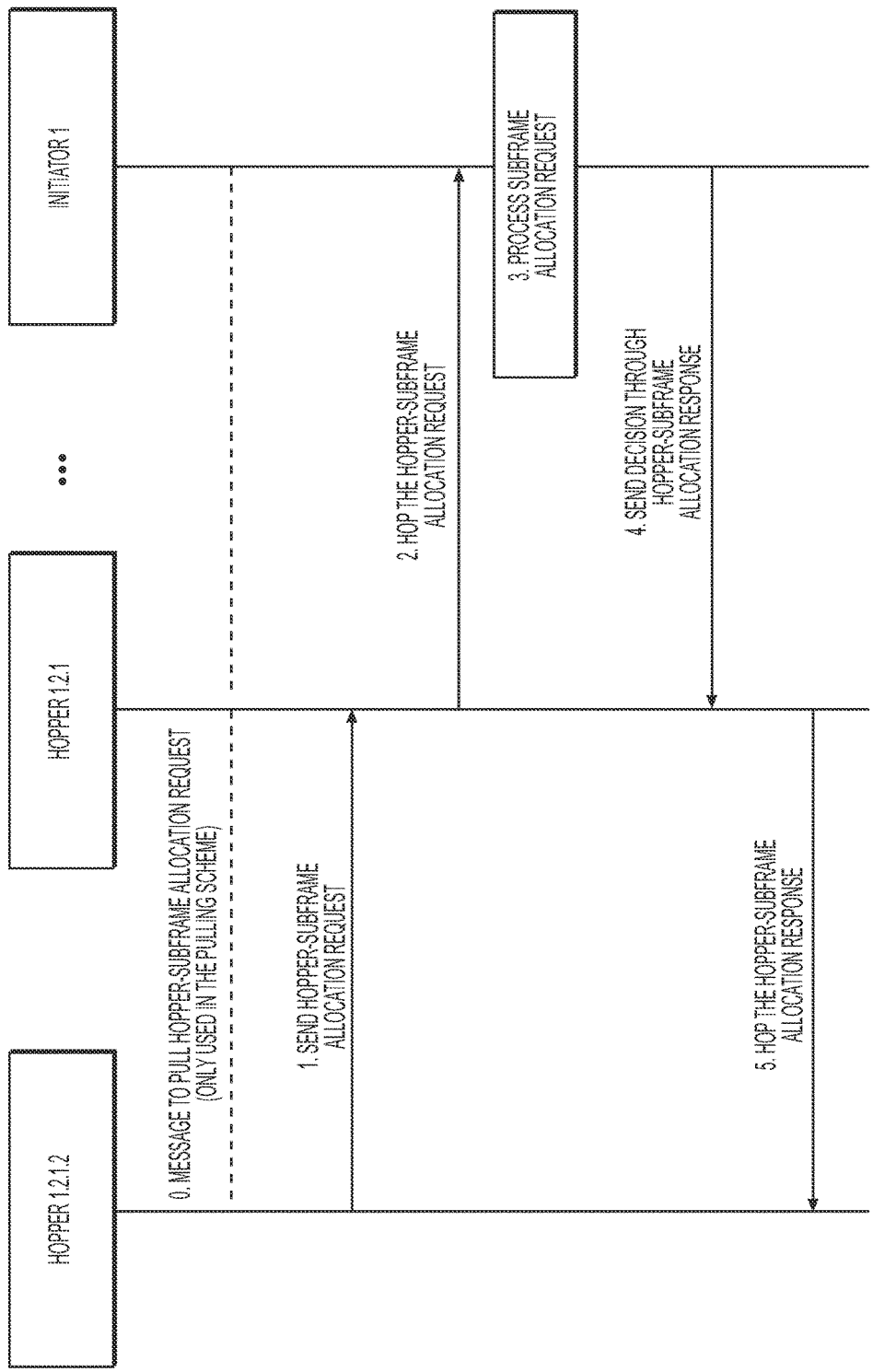
FIG. 10A illustrates an embodiment of a process for a new hopper to request a Hopper-subframe.

In another embodiment as shown in FIG. 10A, the new Hopper may send a subframe allocation request to another peer (Step 1). This is referred to as the non-pulling scheme. Each of the steps in FIG. 10A is denoted by a numeral, e.g., 1, 2, etc. The new Hopper may initiate Step 1 whenever it receives a channel. In an alternative embodiment, the peer desiring to be a new Hopper receives a pulling message prior to Step 1 from the Initiator (Step 0). This is referred to as the pulling scheme. The following steps are then employed.

According to Step 1, the new Hopper, e.g., 1.2.1.2, sends a subframe allocation request to its Hopper, e.g., Hopper 1.2.1. This allocation request may include but is not limited to the following information: (i) the new Hopper's MAC address; (ii) the new Hopper's Tier-frame number; (iii) the Tier-frame number of the new Hopper's Hopper; (iv) PSet, SSet or ISet of the new Hopper's Hopper-subframe; and (v) the length of the Hopper-subframe it requests.

According to Step 2, the subframe allocation request will be forwarded until it reaches the Initiator 1. As shown in FIG. 9, Hopper 1.2.1 forwards the allocation request through one or more Hoppers to Initiator 1.

Figure 10B:
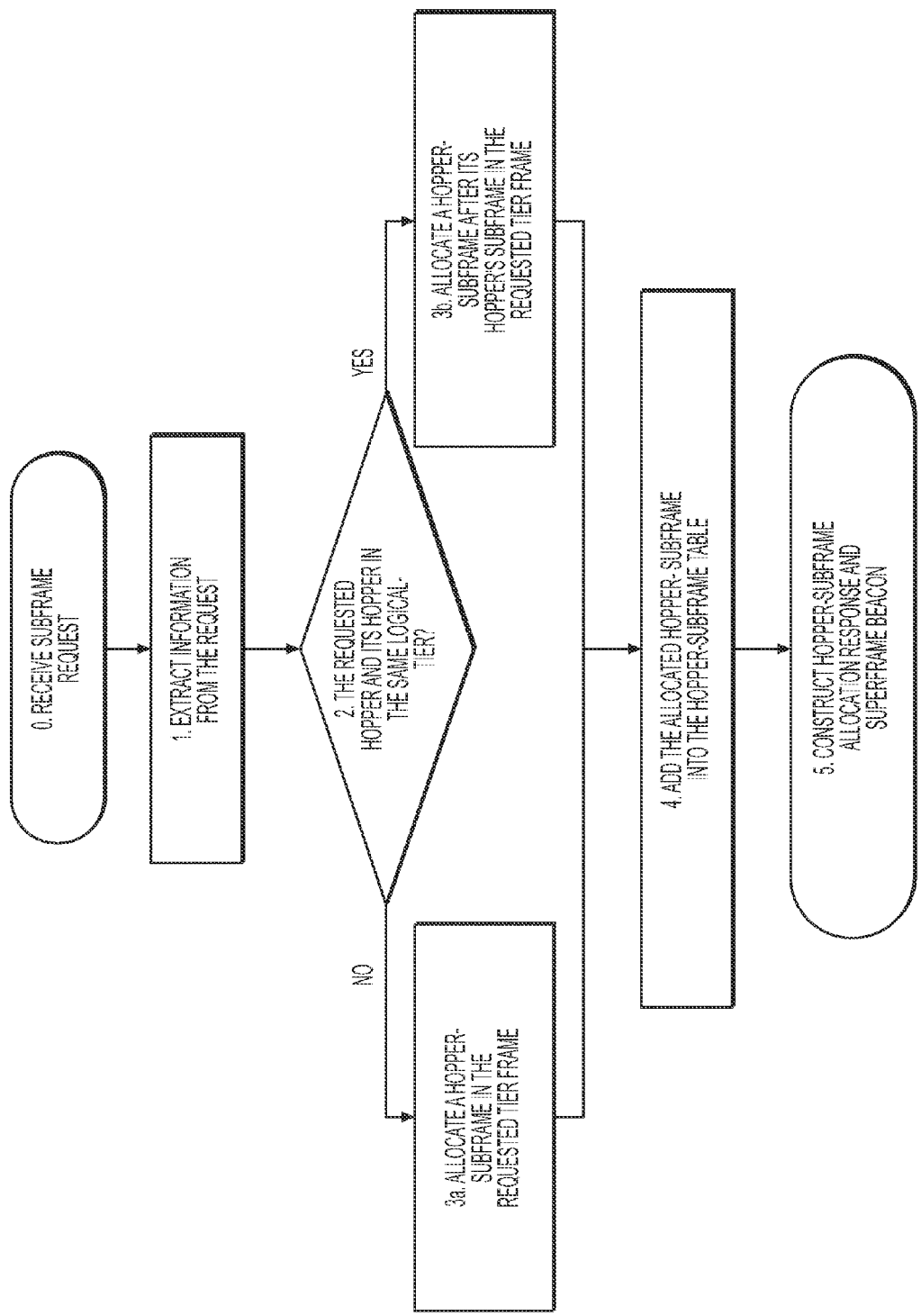
FIG. 10B illustrates an embodiment of a technique for an Initiator to process a subframe allocation request.

According to Step 3, the Initiator 1 processes the subframe request. In an exemplary embodiment as shown in FIG. 10B, the processing steps are described. Numerals, e.g., 0, 1, 2, etc. will denote the steps in the FIG. 10B. Namely, after the Initiator receives the subframe request (Step 0) described in FIG. 10A, information is extracted from the request from the new Hopper (Step 1). The information may include but is not limited to: (i) the new Hopper's Tier-frame number (e.g., Tier-frame 3 for peer 1.2.1.1); (ii) the Tier-frame number of new Hopper's Hopper $l_h$ (e.g., Tier-frame 2 for peer 1.2.1); (iii) PSet, SSet or ISet of the new Hopper's Hopper-subframe; and (iv) the length of the subframe of the new Hopper requested.

The Initiator determines whether the requested Hopper and its current Hopper are in the same logical tier (Step 2). If this is true, the Initiator allocates a Hopper-subframe in the requested Tier frame (Step 3a). Here the Initiator will allocate a Hopper-subframe in the Tier-frame i that does not interfere with any of the existing Hopper-subframes in Tier-frame i. The Initiator follows the rules discussed above such that two Hopper-subframes, such as for example $Sub_{i,s}$ and $Sub_{i,s'}$, in the same Tier-frame 'i' can overlap in time. The Initiator may increase the size of Tier-frame if it cannot allocate the new Hopper-subframe within an existing Tier-frame. Therefore, the superframe length will be increased as necessary.

Alternatively, the Initiator will allocate a Hopper-subframe after the end of its Hopper's Hopper-subframe such that it does not interfere with existing Hopper-subframes in Tier-frame 'I' (Step 3b). This ensures that the new Hopper receives the beacon from its Hopper before sending its own beacon at the beginning of its own Hopper-subframe. The Initiator follows the above-mentioned techniques to determine if two Hopper-subframes, such as for example, $Sub_{i,s}$ and $Sub_{i,s'}$, in the same Tier-frame can overlap in time.

Accordingly, the Initiator will increase the size of Tie-frame 'T' if it cannot allocate the new Hopper-subframe within the existing Tier-frame.

Figure 11:
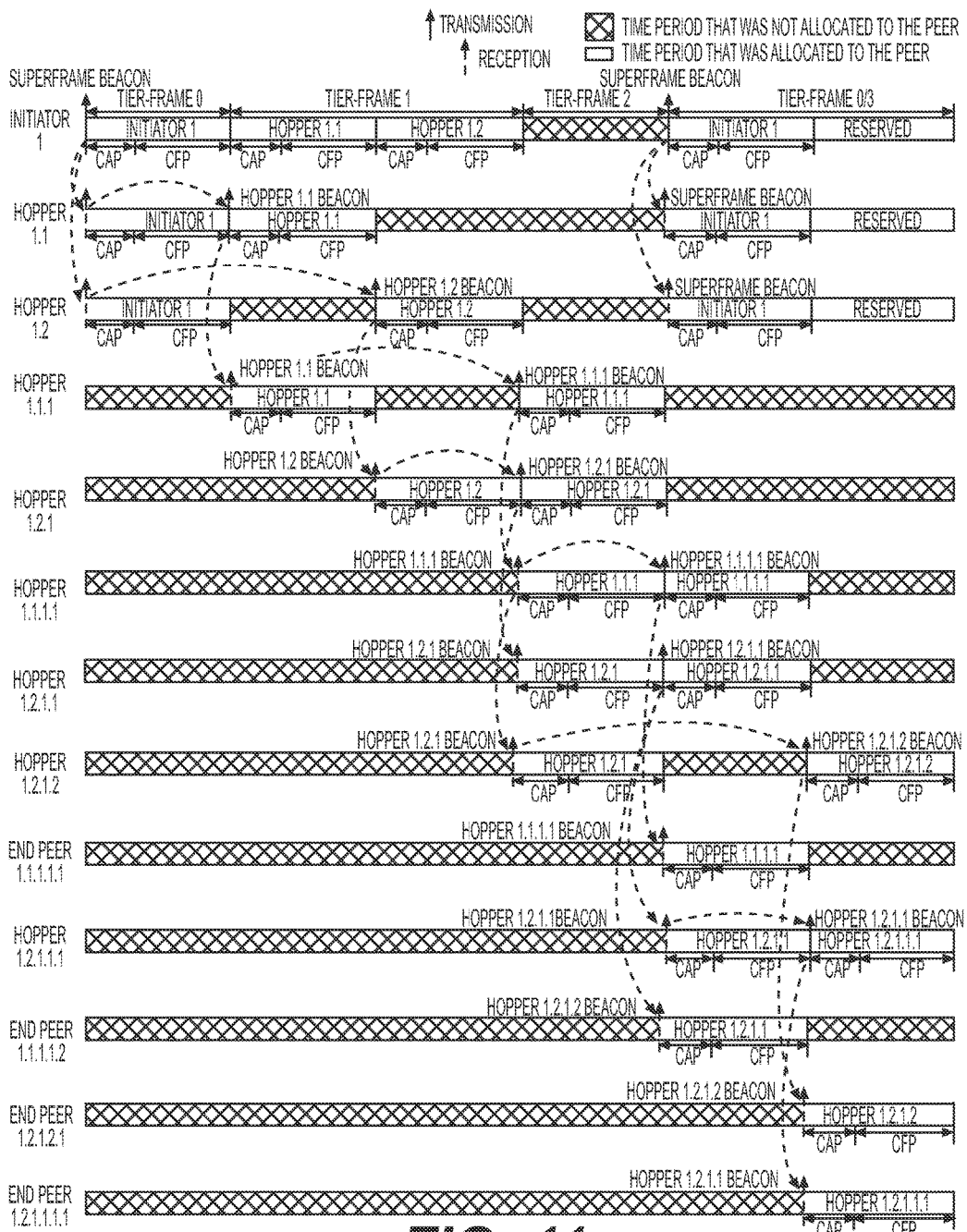
FIG. 11 illustrates an embodiment of a Tier-based frame structure employing Inter and Intra-tier time reuse.

After allocating the new Hopper's Hopper-subframe, the Initiator will add the Hopper-subframe information into the Hopper-subframe Table (Step 4). Thereafter, the Initiator may then construct a subframe allocation response and update the superframe beacon (Step 5). FIG. 11 shows the formalized frame structure of the network after the Initiator allocates Hopper 1.2.1.2's Hopper-subframe. In the formalized frame structure, Tier-frame 0 and Tier-frame 3 overlap in time to achieve inter-Tier time reuse frame structures. Moreover, the Hopper-subframe of Hopper 1.2.1.2 and Hopper-subframe of Hopper 1.2.1.1.1 overlap in time to achieve intra-Tier time reuse frame structures. According to the present application, the frame structure may include inter-Tier and/or intra-Tier frame/time reuse.

According to yet another embodiment, after the Initiator processes the request as described in Steps 1-5 of FIG. 10B, the Initiator 1 sends its decision through the Hopper-subframe allocation response illustrated in FIG. 10A (Step 4). As further illustrated in FIG. 10A, the subframe allocation response is forwarded along until it reaches the new Hopper (Step 5).

Figure 12:
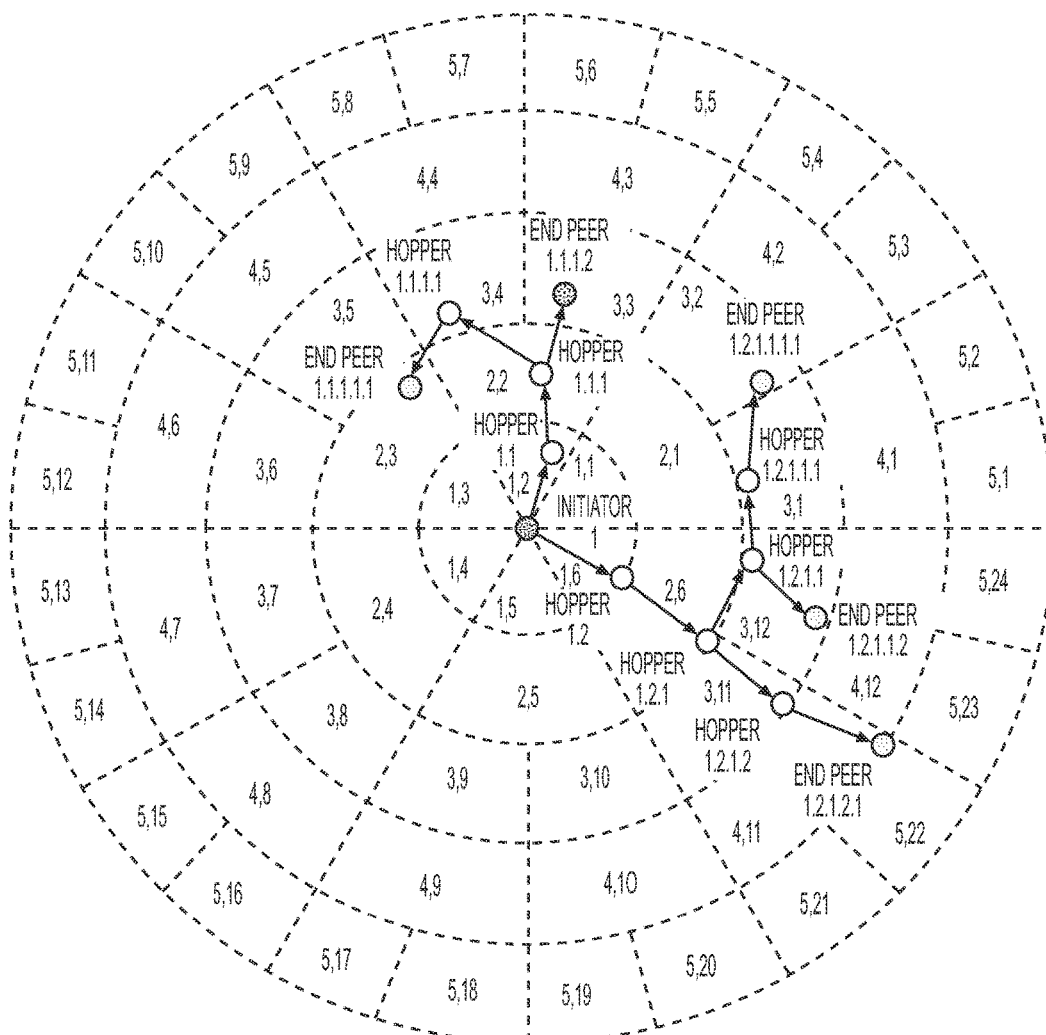
FIG. 12 illustrates an embodiment of a multi-hop topology for a frame-structure update based upon a new peer joining the network.

According to yet another embodiment of the application, a technique is described for an existing hopper to update an allocated Hopper-subframe. In one example, as shown in FIG. 12, a new End Peer 1.1.1.2 joins the network and selects Hopper 1.1.1 as its Hopper after the network has formalized its frame structure. Since Hopper 1.1.1 already has its allocated Hopper-subframe, the procedure to update its Hopper-subframe is different from the technique discussed above in which a peer wants to become a new Hopper. The new procedure is shown in FIGS. 13 and 14 and the updated frame structure after the procedure is shown in FIG. 15.

Figure 13:
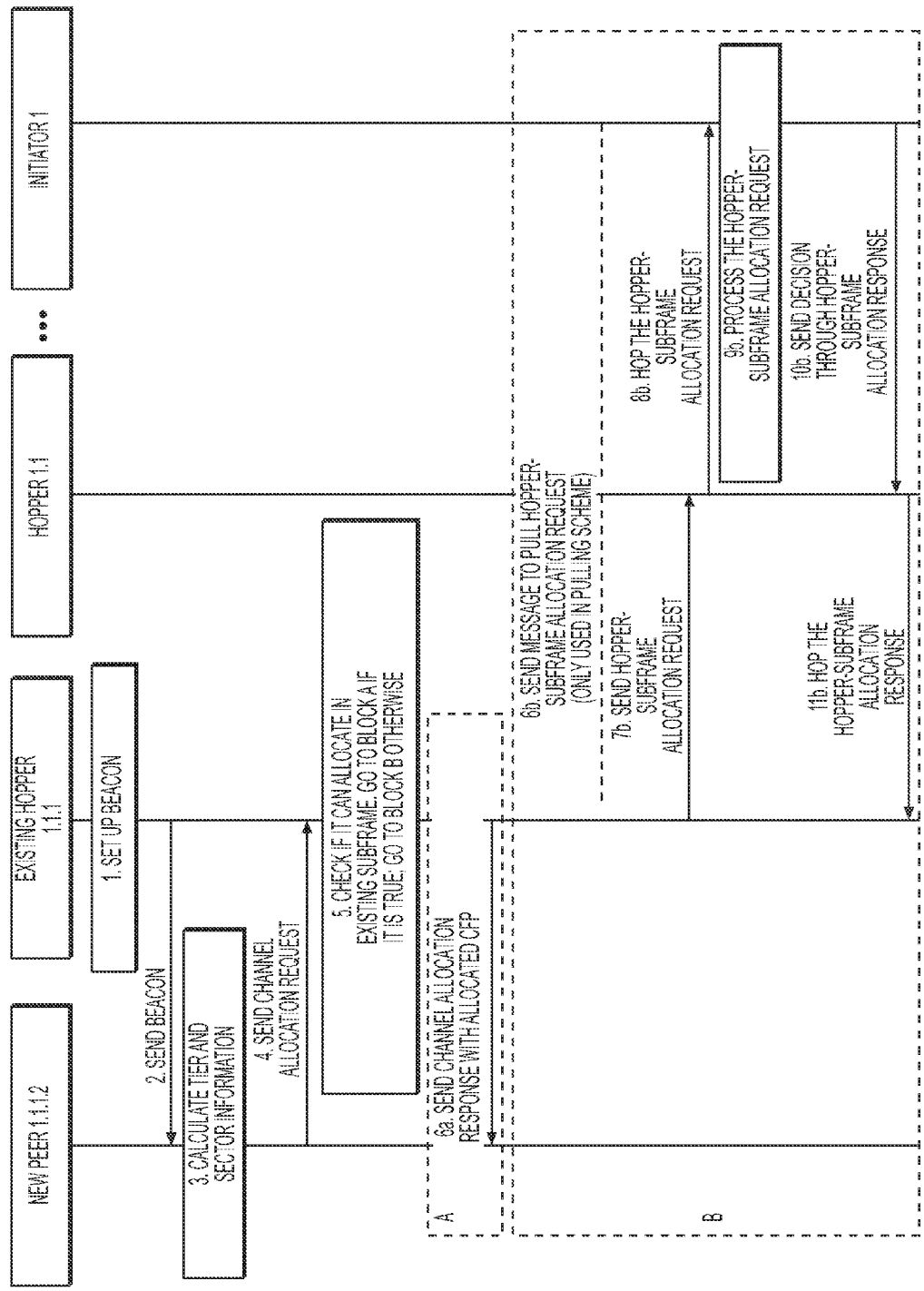
FIG. 13 illustrates an embodiment of a process for an existing hopper to allocate a new resource for a new Peer.

As shown in FIG. 13, an Existing Hopper 1.1.1 may set up a Hopper beacon including relevant information as discussed above (Step 1). Each of the steps is denoted by a numeral, e.g., 0, 1, 2, etc. The Existing Hopper 1.1.1 sends the beacon at the beginning of its Hopper-subframe (Step 2). After receiving the beacon, the new Peer 1.1.1.2 will extract the location of the Initiator, the value of R, the start and end time of CAP and CFP of the Hopper's subframe, and will calculate its Tier and Sector information as discussed above (Step 3). The new Peer 1.1.1.2 sends a channel allocation request to Existing Hopper 1.1.1 during CAP (Step 4). This message may include but is not limited to the following information: (i) the new Peer's MAC address; (ii) the new Peer's Sector number (e.g., $Sector_{3,3}$ for peer 1.1.1.2); and (iii) the length of the CFP it requests.

As illustrated by Step 5, the existing Hopper 1.1.1 checks whether it can allocate a Hopper subframe in the existing subframe. The existing Hopper 1.1.1 may use the decision tree protocol shown in FIG. 14 to determine if it can allocate the requested CFP slots in existing Hopper-subframes. As shown in FIG. 14, after receiving the channel allocation request (Step 0), the hopper, e.g., 1.1.1 checks whether the new peer's Sector number, $Sector_{new}$, is in its Hopper-subframe SSet (Step 1). If the Hopper 1.1.1 concludes in the negative, it returns FALSE and sends a subframe allocation request (Step 3b). Meanwhile, if Hopper 1.1.1 concludes in the affirmative, the next inquiry is made. In particular, whether Hopper 1.1.1 has enough slots to allocate. If Hopper 1.1.1 concludes in the negative, it returns FALSE and sends a subframe allocation request (Step 3b). However, if Hopper 1.1.1 concludes in the affirmative, it returns TRUE and allocates the requested CFP in the existing Hopper subframe.

Figure 14:
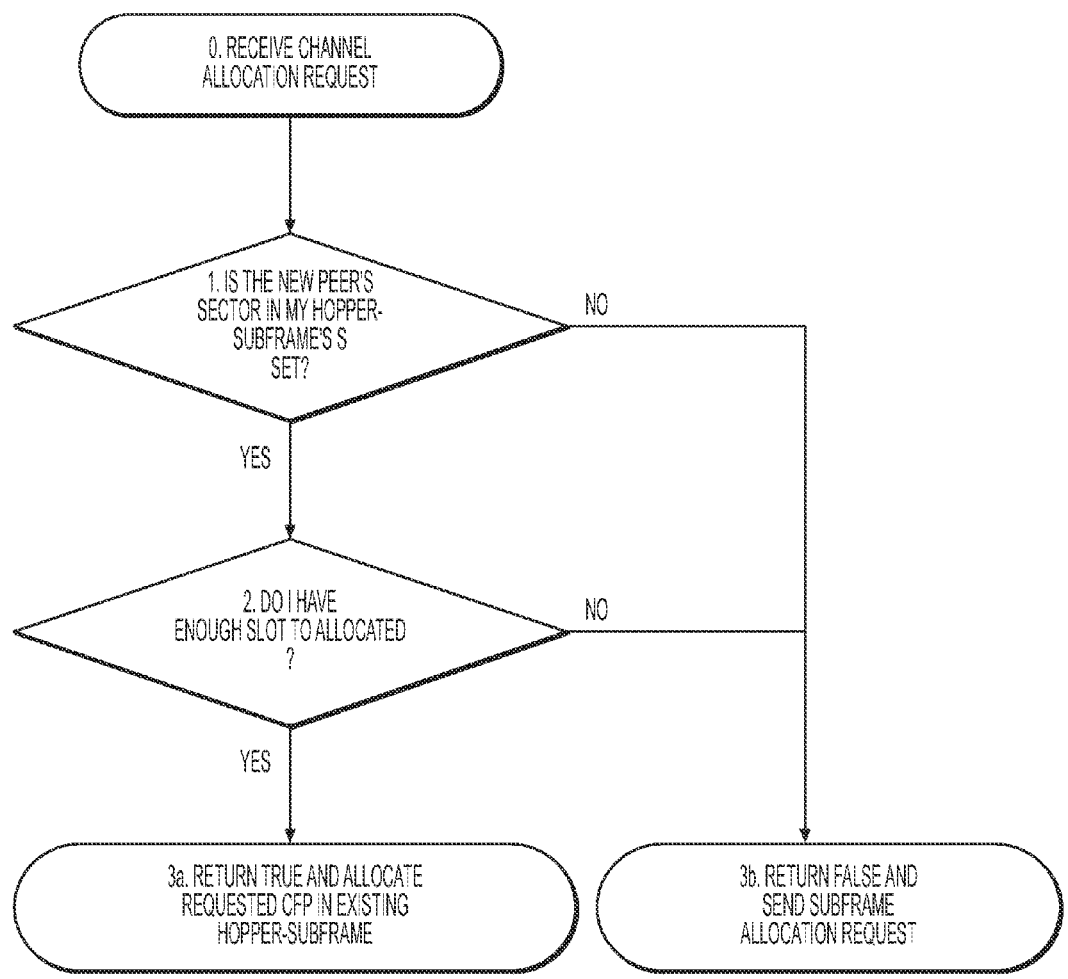
FIG. 14 illustrates an embodiment for process for an existing hopper to decide whether to send a subframe allocation request to an Initiator.
Figure 15:
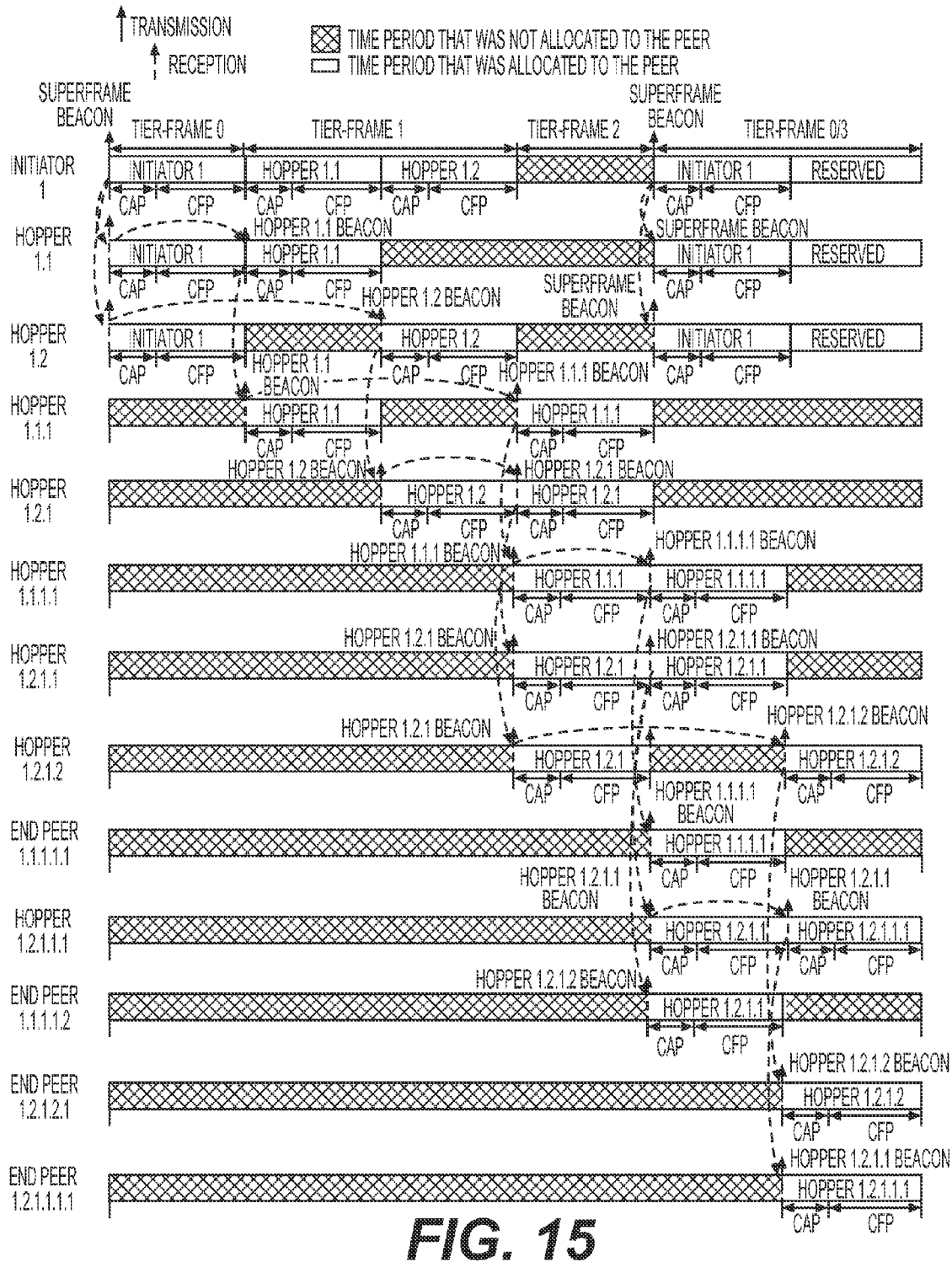
FIG. 15 illustrates an embodiment of a Tier-based frame structure employing Intra-tier time reuse.

Steps 3a and 3a illustrated in FIG. 14 are related to Steps 6a and 6b illustrated in FIG. 13. Namely, in Step 6a, Existing Hopper 1.1.1 sends a channel allocation response to New Peer 1.1.1.2 with allocated slots in CFP. This is also referred to as a Block A in FIG. 13. Alternatively, the Initiator sends a message to pull a Hopper-subframe allocation request in Step 6b. This may only be used in a pulling scheme for the allocation request as discussed above. This is also referred to as Block B in FIG. 13.

As shown in Block B of FIG. 13, the existing Hopper Peer 1.2.1.2 may send a subframe allocation request to its Hopper, e.g., Hopper 1.2.1, (Step 7b). This message may contain the following information: (i) Tier-frame number of the existing Hopper, e.g., Tier-frame 2 for peer 1.1.1; (ii) the Tier-frame number of existing Hopper's Hopper, e.g., Tier-frame 1 for peer 1.1; (iii) PSet, SSet or ISet of the existing Hopper's Hopper-subframe; and (iv) the length of the Hopper-subframe it requests. The subframe allocation request will be hopped until it reaches the Initiator 1 (Step 8b). Further, the Initiator processes the request in a similar technique as discussed above (Step 9b). Next, the Initiator sends its decision through subframe allocation response (Step 10b). Further, the subframe allocation response is hopped until it reaches the new Hopper (Step 11b).

FIG. 15 shows the formalized frame structure of the network after the new Peer, e.g., End Peer 1.1.1.2, joins the network. Here, Hopper 1.1.1 allocates the CFP of the new Peer 1.1.1.2 within its existing Hopper-subframe. Accordingly, Hopper 1.1.1's Hopper-subframe and Hopper 1.2.1's Hopper-subframe overlap in time to achieve intra-Tier frame/time reuse. While inter-Tier frame/time reuse is not expressly indicated in this figure, inter-Tier frame/time reuse may be envisaged according to the present application.

A Distributed Technique to Form a Tier Based Frame Structure

According to another aspect of the application, a method for exchanging Hopper-subframe Allocation Information among peers is described. Namely, peers exchange Hopper-subframe allocation information to help Hoppers in the network allocate Hopper-subframes without interfering with existing Hopper-subframes. It is envisaged that peers in the network may exchange messages either proactively or reactively.

In one embodiment, the message is exchanged proactively. Here, an existing peer in the network periodically broadcasts Hopper-subframe allocation advertisement messages to inform peers within its transmission range about Hopper-subframes it communicates in. In another embodiment, describing the reactive scheme, an existing peer may only send Hopper-subframe allocation advertisement messages when it receives a request from another peer.

Peers that are already allocated to a CFP in its Hopper's Hopper-subframe will broadcast Hopper-subframe allocation advertisement messages in their allocated CFP period. On the other hand, peers that have not allocated a CFP in its Hopper's Hopper-subframe will broadcast Hopper-subframe allocation advertisement messages in a CAP period.

A Hopper-subframe allocation advertisement message contains information of all Hopper-subframes the peer communicates with as shown in Table 6.

TABLE 6

| FIELD | DESCRIPTION |
| --- | --- |
| Hopper Flag | Indicate if the message is sent from a Hopper. Set to 1 if the sender is a Hopper and set to 0 if the sender in an End Peer. |
| Information of Hopper-subframes 1 | Hopper-subframe information of the Hopper-subframe that uses to communicate with its Hopper, i.e. its Hopper's Hopper-subframe. |
| Information of Hopper-subframes 2 (optional) | This field is only used if the peer is a Hopper, which contains Hopper-subframe information of Hopper-subframe that uses to communicate with its peer(s), i.e., its own Hopper-subframe. |

If the peer is a Hopper, its Hopper-subframe allocation advertisement message contains information of its Hopper's Hopper-subframe and its Hopper-subframe. If the peer is an End Peer, its Hopper-subframe allocation advertisement messages only contains its Hopper's Hopper-subframe information.

As shown in Table 7 below, the information of a Hopper-subframe may contain: (i) Tier-frame number; (ii) Start offset; and (iii) End offset of the Hopper-subframe.

TABLE 7

| NAME | DESCRIPTION |
| --- | --- |
| Tier-frame number | Tier-frame number of the Hopper-subframe |
| Start offset | Start time/slot of the Hopper-subframe from the beginning of its Tier-frames. |
| End offset | End time/slot of the Hopper-subframe from the beginning of its Tier-frames. |

Moreover, when a peer receives a Hopper-subframe allocation advertisement message, it will update its one-hop neighbor shown in Table 8.

TABLE 8

| FIELD | DESCRIPTION |
| --- | --- |
| Peer's MAC Address | The MAC address of the Peer that sends the Hopper-subframe allocation advertisement message. |
| Ownership | The ownership of the Hopper-subframe. Set to 0 if the Hopper-subframe is owned by the peer's Hopper; set to 1 if the Hopper-subframe is owned by the peer |
| Hopper-subframe information | Hopper-subframe information as shown in |

Further according to the present embodiment, the one-hop neighbor table contains one entry for its neighbor peer that is an End Peer. The entry stores information including but not limited to (i) the MAC address of the peer; (ii) the ownership of the Hopper-subframe which includes the ownership of the Hopper-subframe information set to 0, which indicates the Hopper-subframe is owned by the peer's Hopper; and (iii) the information of the Hopper-subframe.

Further according to the present embodiment of the application, the one-hop neighbor table may contain two entries for its neighbor peer that is a Hopper. The information may include but is not limited to: (i) two entries having the same MAC address; and (ii) two entries having different ownership values in the Hopper-subframe allocation advertisement message. In the latter, the entry with ownership set to 0 stores the neighbor peer's Hopper-subframe information, while the entry with ownership set to 1 stores the neighbor peer's Hopper's Hopper-subframe information.

The peer updates its one-hop neighbor table according to the one or more rules including, for example: (i) the peer adds new entries when it receives a Hopper-subframe allocation advertisement message from a new neighbor peer or an existing neighbor peer becomes a Hopper; (ii) the peer updates an entry if the Hopper-subframe information stored, e.g., Tier-frame number, Start offset and End offset is different from that in Hopper-subframe allocation advertisement message; and (iii) the peer deletes entries if it does not receive a Hopper-subframe allocation advertisement message from a neighbor for a certain period or a neighbor peer becomes an End Peer and releases its own Hopper-subframe.

Further according to the present embodiment, after a peer makes one or more changes, e.g., add, update or delete, to its neighbor table, it will send a Hopper-subframe allocation update message to its Hopper about the changes as shown in Table 9. Hoppers in the network will maintain an Occupied Hopper-subframe Table that stores information of all Hopper-subframes it cannot use. Hoppers will update the table when they: (i) receive a Hopper-subframe allocation advertisement messages from its neighbors that are not its peers; and (ii) receive Hopper-subframe allocation update messages from its peer.

TABLE 9

| Parameter | Description |
| --- | --- |
| $N_{change}$ | Number of changes entry contains in the Hopper-subframe allocation update message |
| Action of change 1 | The action of the first change entry. The action may be add, delete or update |
| MAC address of change 1 | The MAC address of the first changed entry |
| Ownership of change 1 | The Ownership of the first changed entry |
| Hopper-subframes information of change 1 | Hopper-subframes information (Tier-frame number, start offset and end offset) of the first changed entry if the action is to add or update. |
| Action of change $N_{change}$ | The action of the last changed entry. The action may be add, delete or update |
| MAC address of change $N_{change}$ | The MAC address of the last changed entry |
| Ownership of change $N_{change}$ | The Ownership of the last changed entry |
| Hopper-subframes information of change $N_{change}$ | Hopper-subframes information (Tier-frame number, start offset and end offset) of the last changed entry if the action is add or update. |

Figure 16:
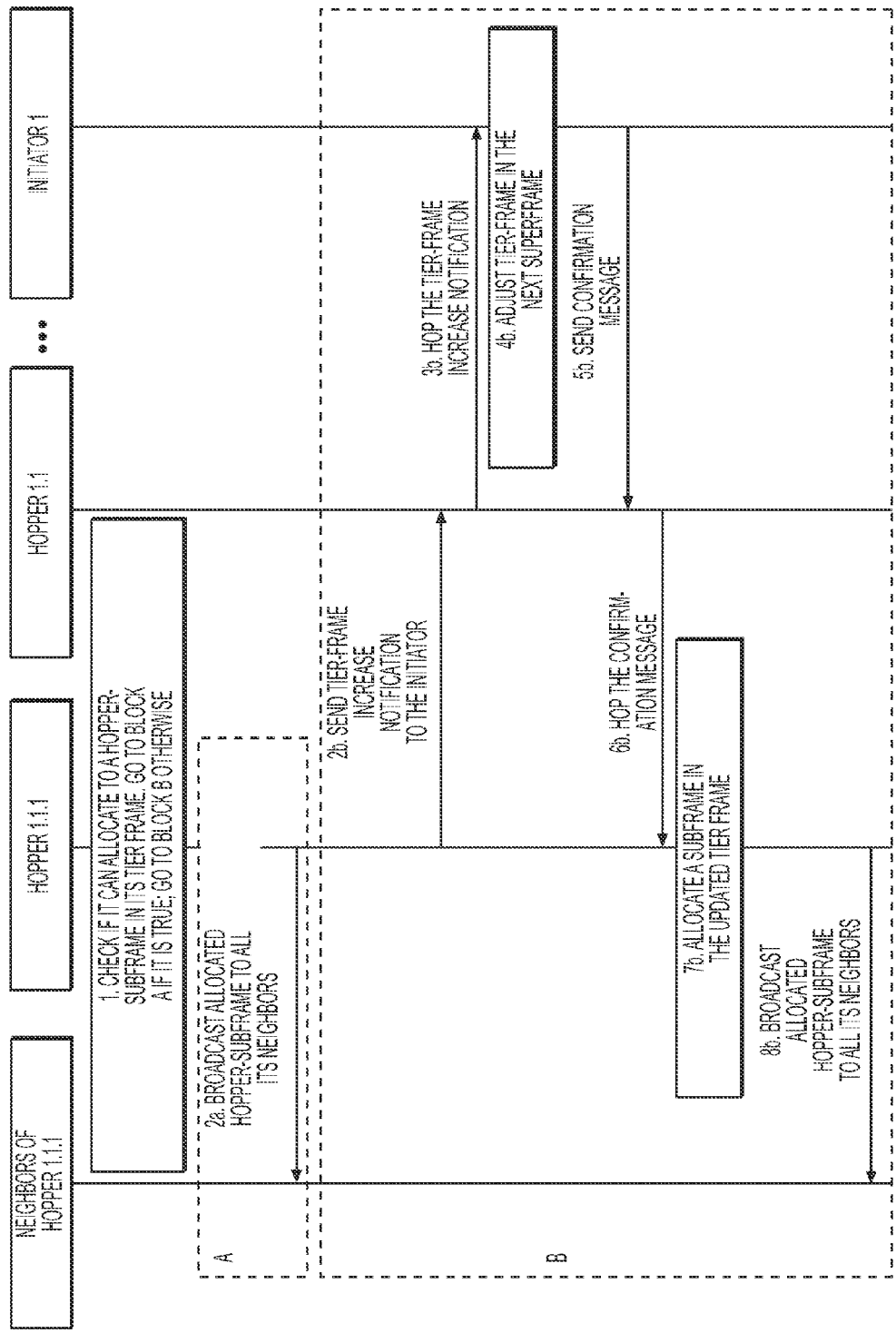
FIG. 16 illustrates an embodiment of a process for a hopper to allocate a new Hopper-subframe or increase the size of an existing Hopper-subframe.

According to a further aspect of the present application, a procedure is disclosed for a Hopper to allocate a Hopper-subframe. As shown in FIG. 16, a Hopper may allocate a new Hopper-subframe or alternatively increase the size of its existing Hopper-subframe if needed, etc. Each of the steps disclosed in FIG. 15 is referenced by a numeral, e.g., 1, 2, etc. First, the Hopper, e.g. Hopper 1.1.1, checks if it can allocate its Hopper-subframe within its Tier-frame (Step 1). The information is received from its Occupied Hopper-subframe as discussed above in Table 9.

Figure 17:
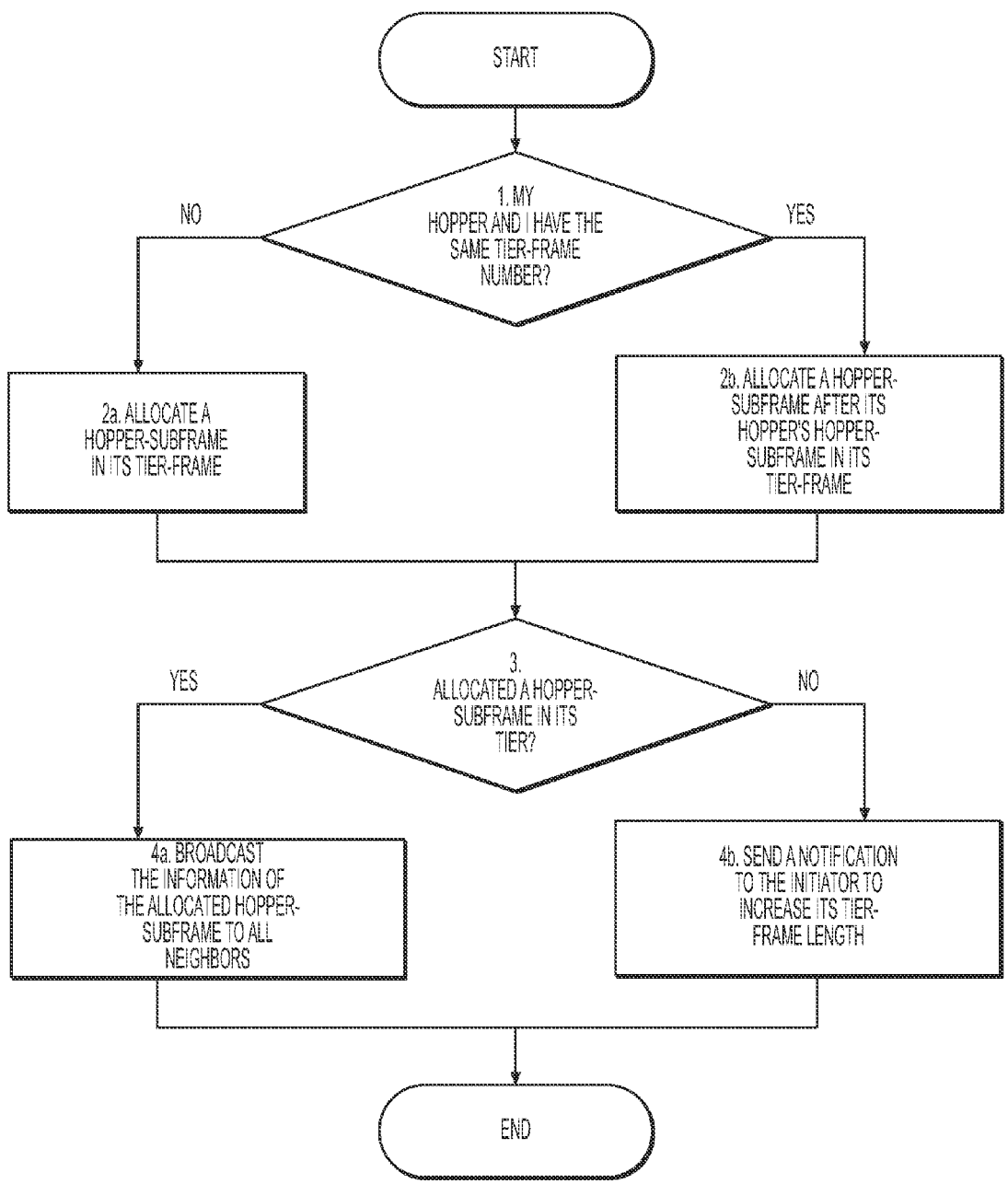
FIG. 17 illustrates an embodiment of a method for a hopper to allocate a Hopper-subframe.

Step 1 is further explained with respect to FIG. 17 where each step is denoted by a numeral, e.g., 1, 2, etc. According to FIG. 17, the Hopper checks if its Hopper-subframe has the same Tier-frame number (Step 1). If the determination is negative, the Hopper will try to allocate its Hopper-subframe in its Tier-frame so that it does not interfere with any Hopper-subframe in its occupied Hopper-subframe Table (Step 2a). Otherwise, if the determination is affirmative, the Hopper will try to allocate its Hopper-subframe after its Hopper's Hopper-subframe in its Tier-frame so that it does not interfere with any Hopper-subframe in its occupied Hopper-subframe Table (Step 2b). Next, the Hopper tries to find a Hopper-subframe to allocate (Step 3). If the determination is in the affirmative, the Hopper will broadcast the information of its allocated Hopper-subframe to all its neighbors (Step 4*a*). The broadcast message includes the Tier-frame number, Start offset and End offset of the allocated Hopper-subframe. Otherwise, if the determination is negative, the Hopper will send a notification to the Initiator to increase its Tier-frame length (Step 4*b*).

After the checking step in FIG. 16 (Step 1), if Hopper 1.1.1 can allocate within its Tier-frame, Hopper 1.1.1 proceeds to Step 2*a* of block A as illustrated in FIG. 16. Here, the Hopper 1.1.1 broadcasts its allocated Hopper-subframe to all its neighbors. Otherwise, Hopper 1.1.1 proceeds to Step 2*b* in Block B illustrated in FIG. 16. According to Step 2*b*, Hopper 1.1.1 sends a Tier-frame Increase Notification to the Initiator to increase its Tier-frame. In the message, it contains information including but not limited to (i) Tier-frame number; and (ii) the new Tier-frame length.

In Step 3*b* of Block 5, Hopper 1.1.1 hops the Tier-frame Increase Notification to the Initiator. Next, the Initiator may adjust Tier-frame length in the next superframe (Step 4*b*). If so, the Initiator sends a confirmation message to confirm the changes (Step 5*b*). Further, the confirmation message is hopped back to Hopper 1.1.1 (Step 6*b*). Next, the Hopper 1.1.1 allocates its Hopper-subframe in the updated Tier-frame (Step 7*b*). Even further, the Hopper 1.1.1 broadcasts its allocated Hopper-subframe to all its neighbors (Step 8*b*).

Figure 18:
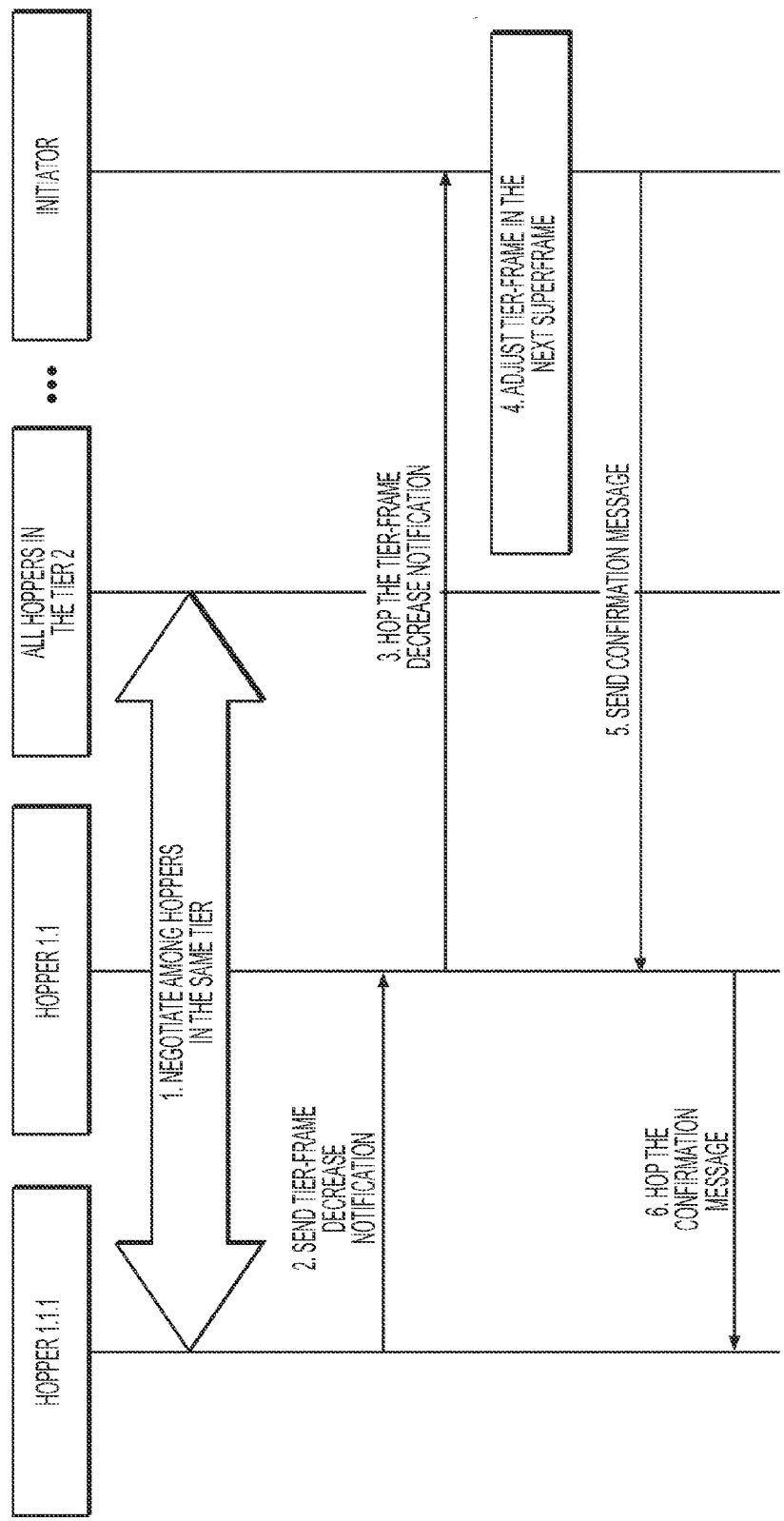
FIG. 18 illustrates an embodiment of a Hopper to release or decrease the size of an existing Hopper-subframe.

According to yet a further aspect of the application, a technique is disclosed for releasing a Hopper from its Hopper-subframe and/or decreasing the size of its existing Hopper-subframe. According to one embodiment as illustrated in FIG. 18, the Hopper 1.1.1 negotiates among Hoppers in the same Tier-frame which resource can be released in its Tier-frame (Step 1). Each step is denoted by a reference numeral, e.g., 1, 2, etc. in FIG. 18. For example, Hopper 1.1.1 may send a Tier-frame Decrease Request to all other Hoppers in the same Tier-frame. The Request may contain information including but not limited to: (i) its Tier-frame number; and (ii) the proposed resource to release. Upon receiving the message, all other Hoppers in the same Tier-frame may (i) check if their Hopper-subframes use the proposed resource; or (ii) reply to Hopper 1.1.1 with the resource agreed to release. The Hopper 1.1.1 may send confirmations to all other Hoppers in the same Tier-frame to release the resource they all agreed upon.

Next, Hopper 1.1.1 may send Tier-frame Decrease Notification to the Initiator to decrease its Tier-frame (Step 2). In the message, it may contain the Tier-frame number and the new length. In addition, the Hopper 1.1 may hop the Tier-frame Decrease Notification to the Initiator (Step 3). Moreover, the Initiator may adjust Tier-frame length in the next superframe (Step 4). Also, the Initiator may send a confirmation message to confirm the changes (Step 5). Further, the confirmation message may be hopped to Hopper 1.1.1 (Step 6).

According to yet another aspect of the application, a non-transitory computer-readable or executable storage medium for storing computer-readable or executable instructions is disclosed. The medium may include one or more computer-executable instructions such as disclosed above in the plural call flows according to FIGS. 6, 7, 10A, 10B, 13, 14, and 16-18. The computer executable instructions may be stored in a memory and executed by a processor disclosed above in FIGS. 1C and 1D, and employed in devices including peers such as an initiator device, hopper device and end use device. In one embodiment, a computer-implemented UE having a non-transitory memory and processor operably coupled thereto, as described above in FIGS. 1C and 1D, is disclosed. Specifically, the non-transitory memory has instructions stored thereon for adding an oneM2M service. The processor is configured to perform one or more of the following instructions: (i) determining whether a hopper subframe in a tier frame may be allocated; (ii) broadcasting an allocated hopper subframe to the hopper neighbor. In another embodiment, the processor is configured to perform one or more of the following instructions: (i) send, via a hopper, a beacon to a new peer; (ii) receive a channel allocation request from the new peer; and (iii) determine whether the channel allocation request can be allocated to an existing subframe.

While the methods, systems and software applications have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A computer-implemented method for updating an allocated hopper subframe in a multi-hop network comprising:
   sending, via a hopper, a beacon to a new peer;
   receiving, from the new peer, a channel allocation request including information of the new peer's sector number;
   determining whether the channel allocation request can be allocated to an existing subframe; and
   sending a channel allocation response to the new peer based upon the determination, wherein
   the determining step occurs at the hopper, and
   the determining step includes evaluating whether a sector of the new peer exists in a sector set of the hopper subframe.

2. The method of claim 1, wherein the information of the channel allocation request includes a MAC address, and a length of a contention free period.

3. The method of claim 2, wherein the channel allocation request is sent during a contention access period.

4. The method of claim 1, wherein the determining step includes evaluating slots to allocate to the new peer.

5. The method of claim 1, further comprising:
   sending a hopper subframe allocation request to an initiator; and
   receiving a hopper subframe allocation response from the initiator.

6. A computer-implemented method to allocate a hopper subframe in a multi-hop network comprising:
   providing a hopper and a hopper neighbor;
   determining whether a hopper subframe in a tier-frame is allocated; and
   broadcasting the hopper subframe allocation advertisement message from the hopper to the hopper neighbor, wherein
   the determining step occurs at the hopper, and
   the determining step includes evaluating whether a sector of a peer exists in a sector set of the hopper subframe.

7. The method of claim 6, wherein the determining step includes checking the tier-frame number of the hopper subframe.

8. The method of claim 7, wherein the determining step includes locating a hopper subframe to allocate.

9. The method of claim 7, further comprising:
   allocating the hopper subframe in an updated tier-frame.

10. The method of claim 6, further comprising:
sending a tier-frame increase notification to an initiator.

11. The method of claim 10, wherein the tier-frame increase notification includes information selected from tier-frame number, tier-frame length and combinations thereof.

12. The method of claim 6, wherein the allocation includes allocating a new hopper subframe or increasing the size of an existing hopper subframe.

* * * * *